US007382344B2

(12) United States Patent
Lee et al.

(10) Patent No.: US 7,382,344 B2
(45) Date of Patent: Jun. 3, 2008

(54) DATA DRIVING APPARATUS AND METHOD FOR LIQUID CRYSTAL DISPLAY

(75) Inventors: Seok Woo Lee, Seoul (KR); Jin Kyoung Song, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 517 days.

(21) Appl. No.: 10/140,068

(22) Filed: May 8, 2002

(65) Prior Publication Data

US 2003/0085865 A1 May 8, 2003

(30) Foreign Application Priority Data

Nov. 3, 2001 (KR) ..................... 10-2001-0068397

(51) Int. Cl.
*G09G 3/36* (2006.01)
*G09G 5/00* (2006.01)
*G06F 3/038* (2006.01)

(52) U.S. Cl. ......................... 345/99; 345/100; 345/211

(58) Field of Classification Search ................ 345/530, 345/544, 565, 55–100, 204–213
See application file for complete search history.

(56) References Cited

U.S. PATENT DOCUMENTS 5,170,158 A 12/1992 Shinya
5,995,073 A * 11/1999 Isami et al. .................. 345/89
6,078,318 A 6/2000 Mori et al.
6,097,362 A 8/2000 Kim
6,256,005 B1 7/2001 Kim ........................... 345/88
6,597,349 B1 7/2003 Koyama et al.
6,628,253 B1 * 9/2003 Hiroki ........................ 345/87
6,795,051 B2 * 9/2004 Ikeda ........................ 345/100
7,180,495 B1 * 2/2007 Matsueda .................... 345/98
7,180,499 B2 * 2/2007 Lee et al. .................. 345/100
7,196,685 B2 * 3/2007 Lee et al. .................... 345/99
2001/0022571 A1 9/2001 Nakano et al.

FOREIGN PATENT DOCUMENTS

DE 19821914 A1 11/1998
DE 19854730 A1 9/1999
EP 0368572 A2 6/1990
EP 1-058-232 12/2000
EP 1 058 232 12/2000
EP 1 191 513 3/2002

* cited by examiner

*Primary Examiner*—Sumati Lefkowitz
*Assistant Examiner*—Srilakshmi K Kumar
(74) *Attorney, Agent, or Firm*—Morgan, Lewis & Bockius LLP

(57) ABSTRACT

A data driving apparatus for a liquid crystal display includes a plurality of digital-to-analog converter integrated circuits, a plurality of output buffer integrated circuits, at least two of the plurality of output buffer integrated circuits being commonly connected to each of the plurality of digital-to-analog converter integrated circuits, and a timing controller for controlling the plurality of digital-to-analog converter integrated circuits and the plurality of output buffer integrated circuits, wherein each of the plurality of digital-to-analog converter integrated circuits is mounted on a tape carrier package connected to a liquid crystal display panel, and each of the plurality of output buffer integrated circuits is mounted on the liquid crystal display panel.

22 Claims, 11 Drawing Sheets

DATA DRIVING APPARATUS AND METHOD FOR LIQUID CRYSTAL DISPLAY

This application claims the benefit of Korean Patent Application No. P2001-68397 filed in Korea on Nov. 3, 2001, which is hereby incorporated by reference.

BACKGROUND OF THE INVENTION

1. Field of the Invention

The present invention relates to a liquid crystal display, and more particularly, to a data driving apparatus and method for a liquid crystal display, wherein digital-to-analog converters are driven on a time division basis and integrated separately from output buffers, thereby reducing the number of digital-to-analog converter integrated circuits and data carrier packages.

2. Discussion of the Related Art

In general, a liquid crystal display (LCD) controls a light transmittance of a liquid crystal using an applied electric field to display an image (picture). The LCD includes a liquid crystal display panel having liquid crystal cells arranged in a matrix type, and a driving circuit for driving the liquid crystal display panel. The liquid crystal display panel includes gate lines and data lines arranged to cross each other, and each liquid crystal cell is positioned where the gate lines cross the data lines. The liquid crystal display panel is provided with a pixel electrode and a common electrode for applying an electric field to each of the liquid crystal cells. Each pixel electrode is connected to a corresponding one of the data lines via source and drain electrodes of a thin film transistor, which functions as a switching device. The gate electrode of the thin film transistor is connected to a corresponding one of the gate lines, thereby allowing a pixel voltage signal to be applied to the pixel electrodes for each corresponding data line.

The driving circuit includes a gate driver for driving the gate lines, a data driver for driving the data lines, and a common voltage generator for driving the common electrode. The gate driver sequentially applies a scanning signal to each of the gate lines in order to sequentially drive the liquid crystal cells on the liquid crystal display panel one gate line at a time. The data driver applies a data voltage signal to each of the data lines whenever the gate signal is applied to any one of the gate lines. The common voltage generator applies a common voltage signal to the common electrode. Accordingly, the LCD controls a light transmittance by application of an electric field between the pixel electrode and the common electrode in accordance with the data voltage signal for each liquid crystal cell, thereby displaying an image. The data driver and the gate driver are incorporated into a plurality of integrated circuits (IC's). The integrated data driver IC and gate driver IC are mounted in a tape carrier package (TCP) to be connected to the liquid crystal display panel by a tape automated bonding (TAB) system, or mounted in the liquid crystal display panel by a chip on glass (COG) system.

FIG. 1 schematically shows a data driving block of an LCD according to the conventional art. In FIG. 1, a data driving block includes data driving IC's 4 interconnected between a liquid crystal display panel 2 and a data printed circuit board (PCB) 8 via TCP's 6. The data PCB 8 receives various signals including control signals from a timing controller (not shown), data signals, and driving voltage signals from a power generator (not shown), thereby interfacing the various control signals to the data driving IC's 4. Each of the TCP's 6 are electrically interconnected between a data pad that is provided at an upper portion of the liquid crystal display panel 2 and an output pad that is provided at each data PCB 8. The data driving IC's 4 convert digital pixel data into analog pixel signals in order to apply the analog pixel signals to data lines on the liquid crystal display panel 2.

FIG. 2 is a detailed block diagram showing a configuration of the data driving integrated circuit in FIG. 1 according to the conventional art. In FIG. 2, each of the data driving IC's 4 includes a shift register part 14 for applying a sequential sampling signal, a latch part 16 for sequentially latching and simultaneously outputting a pixel data VD in response to the sampling signal, a digital-to-analog converter (DAC) 18 for converting the pixel data VD received from the latch part 16 into a pixel signal, and an output buffer part 26 for buffering and outputting the pixel signal received from the DAC 18. Furthermore, the data driving IC 4 includes a signal controller 10 for interfacing various control signals from a timing controller (not shown) and the pixel data VD, and a gamma voltage part 12 for supplying positive and negative gamma voltages required in the DAC 18. Each of the data driving IC's 4 drives an n-number of data lines D1 to Dn.

The signal controller 10 controls various control signals (i.e., SSP, SSC, SOE, REV and POL, etc.) and the pixel data VD to output the control signals and pixel data VD to various corresponding elements. The gamma voltage part 12 sub-divides several gamma reference voltages from a gamma reference voltage generator (not shown) for each gray level and outputs signals to the DAC 18.

The shift register part 14 includes an n-number of shift registers that sequentially shift a source start pulse SSP that is received from the signal controller 10 in response to a source sampling clock signal SSC, and output the source start pulse SSP as a sampling signal.

The latch part 16 sequentially samples the pixel data VD received from the signal controller 10 in response to the sampling signal received from the shift register part 14 to latch the pixel data VD. Accordingly, the latch part 16 comprises an n-number of latches for latching an n-number of pixel data VD, wherein each of the n-number of latches has a size corresponding to a bit number (i.e., 3 bits or 6 bits) of the pixel data VD. Specifically, a timing controller (not shown) simultaneously outputs the pixel data VD divided into even pixel data VDeven and odd pixel data VDodd via each transmission line, thereby reducing transmission frequency. Each of the even pixel data VDeven and the odd pixel data VDodd includes red (R), green (G) and blue (B) pixel data. Thus, the latch part 16 simultaneously latches the even pixel data VDeven and the odd pixel data VDodd received from the signal controller 10, i.e., 6 pixel data for each sampling signal. Subsequently, the latch part 16 simultaneously outputs an n-number of pixel data VD in response to a source output enable signal SOE received from the signal controller 10. The pixel data VD, which has a transited bit number that exceeds a reference value, is modulated to have a reduced transition bit number in order to minimize an electromagnetic interference (EMI) upon transmission from the timing controller. Accordingly, the latch part 16 restores the modulated pixel data VD to have a reduced transition bit number in response to a data inversion selecting signal REV, and then outputs the pixel data VD.

The DAC 18 simultaneously converts and outputs the pixel data VD from the latch part 16 into positive and negative pixel signals. Accordingly, the DAC 18 includes a positive (P) decoding part 20 and a negative (N) decoding part 22 that are commonly connected to the latch part 16, and a multiplexor (MUX) 24 for selecting output signals of the P decoding part 20 and the N decoding part 22.

The P decoding part includes an n-number of P decoders that convert an n-number of pixel data simultaneously inputted from the latch part 16 into positive pixel signals in response to positive gamma voltages received from the gamma voltage part 12. The N decoding part 22 includes an n-number of N decoders that convert an n-number of pixel data simultaneously inputted from the latch part 16 into negative pixel signals in response to negative gamma voltages received from the gamma voltage part 12. The multiplexor 24 responds to a polarity control signal POL received from the signal controller 10 in order to selectively output the positive pixel signals from the P decoding part 20 or the negative pixel signals from the N decoding part 22.

The output buffer part 26 includes an n-number of output buffers that comprise voltage followers that are connected in series to the n-number of data lines D1 to Dn. The output buffers buffer the pixel voltage signals received from the DAC 18, and apply the buffered pixel voltage signals to the n-number of data lines D1 to Dn.

Accordingly, each of the data driving IC's 4 according to the conventional art require an n-number of shift registers, an n-number of latches, and a 2n-number of decoders in order to drive the n-number of data lines D1 to Dn. As a result, the data driving IC's 4 according to the conventional art have a complex configuration, and hence a relatively high manufacturing cost.

SUMMARY OF THE INVENTION

Accordingly, the present invention is directed to a data driving apparatus and method for a liquid crystal display that substantially obviates one or more of problems due to limitations and disadvantages of the related art.

Another object of the present invention is to provide a data driving apparatus and method for driving a liquid crystal display wherein digital-to-analog converters are driven on a time-division basis and output buffers are separately mounted in a liquid crystal display panel, thereby reducing the number of digital to analog converter integrated circuits and data carrier packages.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a data driving apparatus for a liquid crystal display includes a plurality of digital-to-analog converter integrated circuits for converting an n-number of input pixel data (wherein n is an integer) into pixel voltage signals and dividing the n-number of input pixel data into at least two ½n-number of input pixel data for outputting the divided pixel voltage signals, a plurality of output buffer integrated circuits, each having an n-number of channels (wherein n is an integer), for receiving the divided pixel voltage signals and buffering and outputting to each of an n-number of data lines, at least two of the plurality of output buffer integrated circuits being commonly connected to each of the plurality of digital-to-analog converter integrated circuits, and a timing controller for controlling the plurality of digital-to-analog converter integrated circuits and the plurality of output buffer integrated circuits, re-arranging a 2n-number of pixel data (wherein n is an integer) to be supplied to each of the plurality of digital-to-analog converter integrated circuits in accordance with a sequence applied to the at least two output buffer integrated circuits, and performing a time-division of the 2n-number of pixel data to provide at least two regions comprising each of an n-number of pixel data, wherein each of the plurality of digital-to-analog converter integrated circuits is mounted on a tape carrier package connected to a liquid crystal display panel, and each of the plurality of output buffer integrated circuits is mounted on the liquid crystal display panel.

In another aspect of the present invention, a data driving apparatus for a liquid crystal display includes a plurality of digital-to-analog converter integrated circuits for converting an n-number of input pixel data into an n-number of pixel voltage signals and making a k-number of time-divisions of the n-number of pixel voltage signals for outputting a 2n-number of time-divided pixel voltage signals (wherein n and k are integers), a plurality of output buffer integrated circuits, each having a 2n-number of channels (wherein n is an integer), for holding the 2n-number of time-divided pixel voltage signals in a "k-by-k" order and for buffering the 2n-number of time-divided pixel voltage signals when all the of 2n-number of pixel voltage signals have been input, and simultaneously outputting the buffered pixel voltage signals to a 2n-number of data lines, and a timing controller for controlling the plurality of digital-to-analog converter integrated circuits and the plurality of output buffer integrated circuits, and for making an n-number of time-divisions of the n-number of input pixel data to be supplied to the plurality of digital-to-analog converter integrated circuits, wherein each of the plurality of digital-to-analog converter integrated circuits is mounted on a tape carrier package connected to a liquid crystal display panel, and each of the plurality of output buffer integrated circuits is mounted on the liquid crystal display panel.

In another aspect of the present invention, a data driving apparatus for a liquid crystal display includes a plurality of digital-to-analog converter integrated circuits for converting an n-number of input pixel data into an n-number of pixel voltage signals and making a k-number of time-divisions of the n-number of pixel voltage signals for outputting a k-number of time-divided pixel voltage signals (wherein n and k are integers), a plurality of output buffer integrated circuits for holding and buffering the k-number of time-divided pixel voltage signals when the n-number of pixel voltage signals are input into the output buffer integrated circuits, and outputting the buffered pixel voltage signals to an n-number of data lines, at least two of the plurality of output buffer integrated circuits being commonly connected to each of the plurality of digital-to-analog converter integrated circuits, and a timing controller for controlling the plurality of digital-to-analog converter integrated circuits and the plurality of output buffer integrated circuits, and for making a time-division of the n-number of input pixel data to be supplied to each of the plurality of digital-to-analog converter integrated circuits into at least two regions comprising each of the n-number of input pixel data, wherein each of the plurality of digital-to-analog converter integrated circuits is mounted on a tape carrier package connected to a liquid crystal display panel, and each of the plurality of output buffer integrated circuits is mounted on the liquid crystal display panel.

In another aspect of the present invention, a method of driving a data driving apparatus for driving data lines arranged in a liquid crystal display panel, wherein the data driving apparatus includes a plurality of digital-to-analog converter integrated circuits connected to a timing controller and a plurality of output buffer integrated circuits connected to each of an n-number of data lines and connected to each of the plurality of digital-to-analog converter integrated circuits in at least two-by-two (wherein n is an integer), the method includes re-arranging pixel data input from the timing controller and supplying an n-number of first input pixel data of a 2n-number of input pixel data to each of the plurality of digital-to-analog converter integrated circuits, converting the n-number of first input pixel data input from each of the plurality of digital-to-analog converter integrated circuits into a n-number of pixel voltage signals, dividing the converted n-number of pixel voltage signals in a $$\text{“}\frac{1}{2}\text{n-by-}\frac{1}{2}\text{n”}$$

order to output the converted n-number of pixel voltage signals to the at least two output buffer integrated circuits, holding the converted n-number of pixel voltage signals received from each of the at least two output buffer integrated circuits, applying an n-number of second input pixel data of the 2n-number of input pixel data received from the timing controller to each of the plurality of digital-to-analog converter integrated circuits, converting the n-number of second input pixel data input from each of the plurality of digital-to-analog converter integrated circuits into analog pixel voltage signals, dividing the analog-converted pixel voltage signals by $$\frac{1}{2}n$$

to output the divided analog-converted pixel voltage signals to each of the at least two output buffer integrated circuits, and buffering the pixel voltage signals input from each of the plurality of output buffer integrated circuits along with the held pixel voltage signals to simultaneously apply the buffered pixel voltage signals and held pixel voltage signals to the n-number of data lines.

In a further aspect of the present invention, a method of driving a data driving apparatus for driving data lines arranged in a liquid crystal display panel, wherein the data driving apparatus includes a plurality of digital-to-analog converter integrated circuits connected to a timing controller and a plurality of output buffer integrated circuits connected to each of the plurality of digital-to-analog converter integrated circuits and connected to each of a 2n-number of data lines (wherein n is an integer), the method includes supplying an n-number of first input pixel data of a 2n-number of input pixel data received from the timing controller to each of the plurality of digital-to-analog converter integrated circuits, converting the n-number of first input pixel data input from each of the plurality of digital-to-analog converter integrated circuits into pixel voltage signals, dividing the converted pixel voltage signals in a “k-by-k” order to output the converted pixel voltage signals to corresponding ones of the plurality of output buffer integrated circuits, sequentially holding the converted pixel voltage signals to hold an n-number of pixel voltage signals, applying an n-number of second input pixel data of the 2n-number of input pixel data received from the timing controller to each of the plurality of digital-to-analog converter integrated circuits, converting the remaining n-number of second input pixel data input from each of the plurality of digital-to-analog converter integrated circuits into analog pixel voltage signals, dividing the converted pixel voltage signals by a k-number to output the converted pixel voltage signals to the corresponding ones of the plurality of output buffer integrated circuits, and holding and buffering the converted pixel voltage signals when the n-number of pixel voltage signal have been input to simultaneously apply the held and buffered pixel voltage signals to the 2n-number of data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
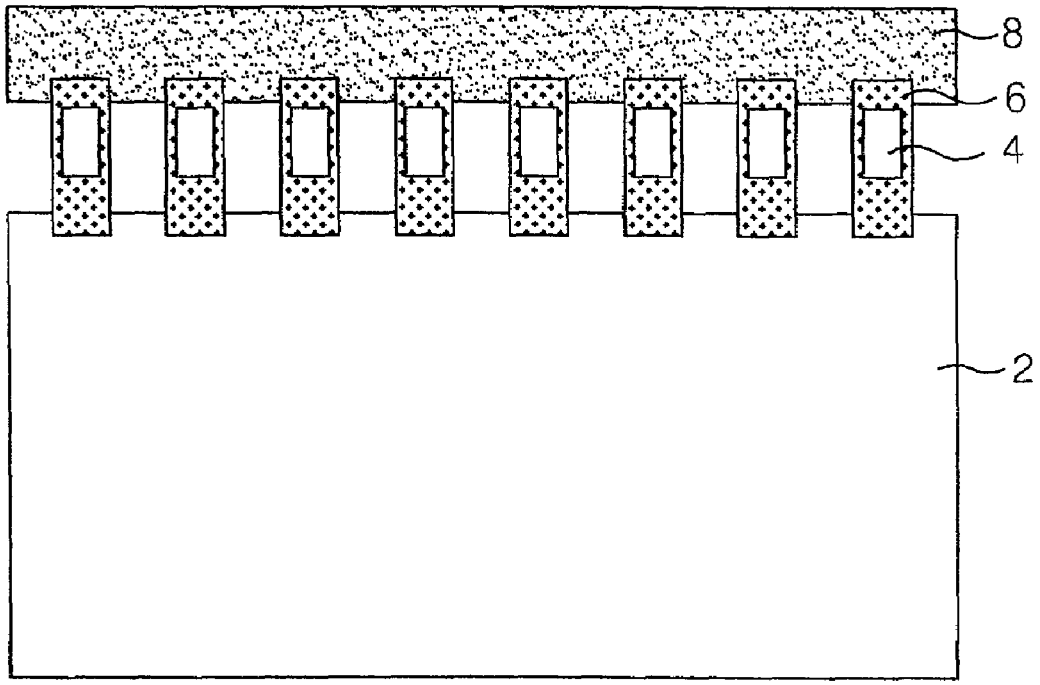
FIG.1 CONVENTIONAL ART
FIG. 1 is a schematic view showing a data driving apparatus for a liquid crystal display according to the conventional art.
Figure 2:
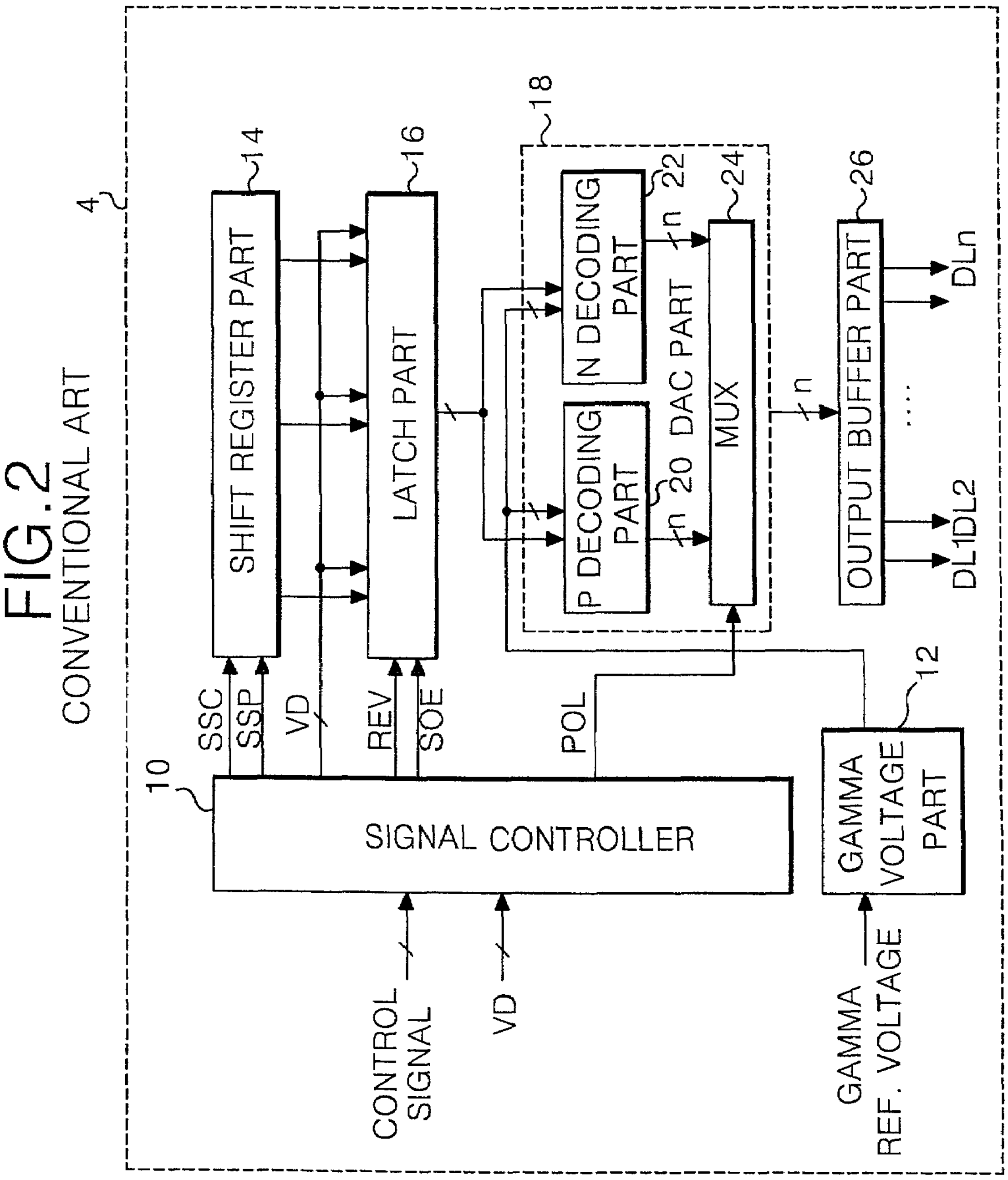
FIG. 2 CONVENTIONAL ART
FIG. 2 is a detailed block diagram showing a configuration of the data driving integrated circuit in FIG. 1 according to the conventional art.
Figure 3:
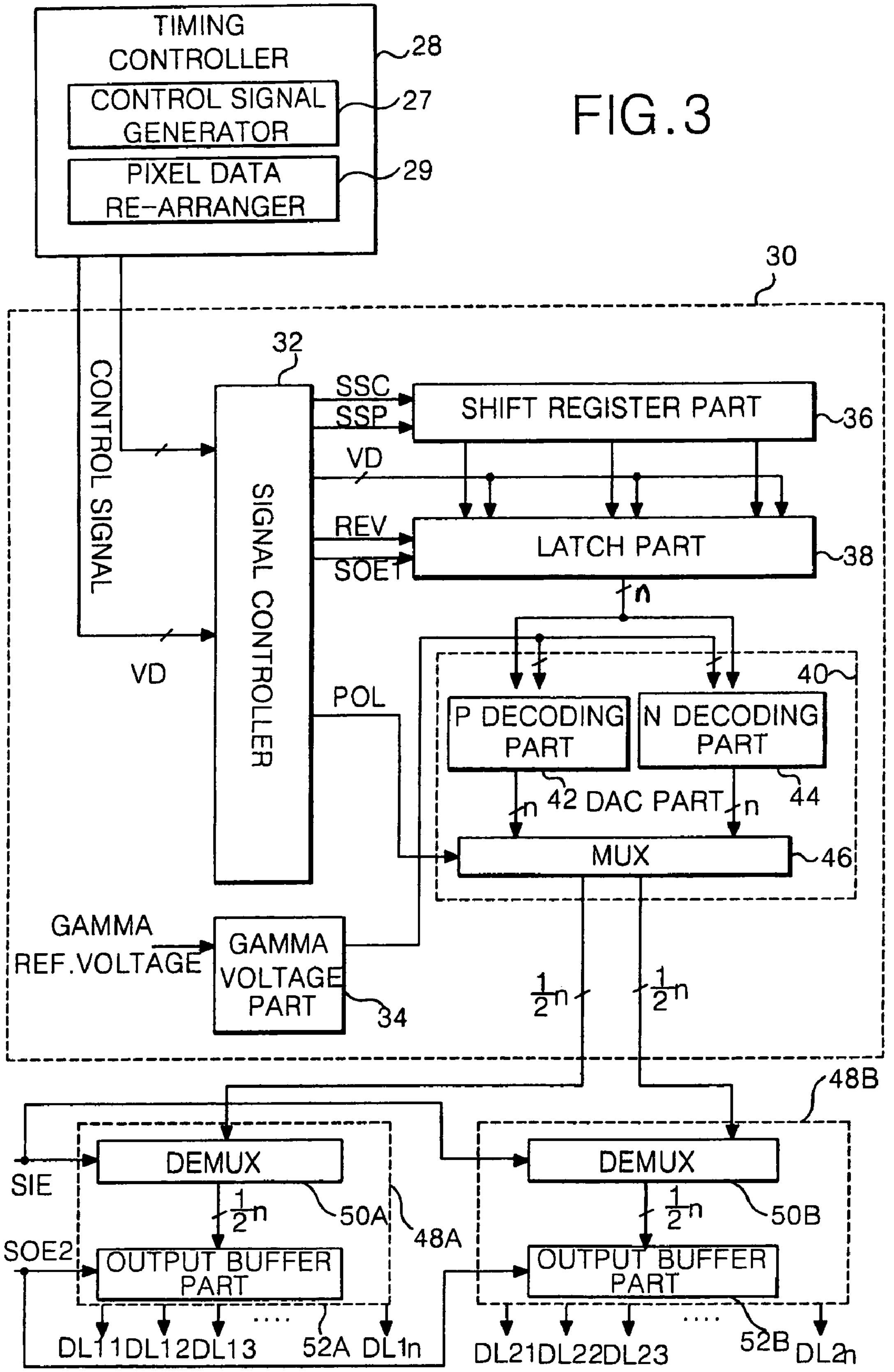
FIG. 3 is a block diagram showing an exemplary configuration of a data driving unit for a liquid crystal display according to the present invention.

FIG. 3 is a block diagram showing an exemplary configuration of a data driving unit for a liquid crystal display according to the present invention. In FIG. 3, a data driving unit connected to a timing controller 28 may be largely divided into a DAC means having a digital-to-analog conversion function, and a buffer means having an output buffering function, which may be integrated into a separate chip. In addition, the data driving unit may have a single DAC IC 30 and at least two output buffer IC's 48A and 48B configured separately.

An example where the first and second output buffer IC's 48A and 48B are commonly connected to a single DAC IC 30 will now be described. The DAC IC 30 may be time-divided into two regions to perform a DAC function, thereby driving a 2n-number of data lines DL11 to DL1n and DL21 to DL2n via the first and second output buffers 48A and 48B, each of which have an n-number of output channels.

The timing controller 28 may supply various control signals for controlling the data driving unit and pixel data VD. Accordingly, the timing controller 28 may include a control signal generator 27 and a pixel data re-arranger 29. The control signal generator 27 may generate various control signals such as SSP, SSC, SOE1, REV, POL, SIE and SOE2, for example, for controlling the data driving unit in response to external vertical and horizontal synchronizing signals and external dot clock signals. The pixel data re-arranger 29 may rearrange an arranged sequence of a 2n-number of pixel data VD, and then time-divide the 2n-number of pixel data VD in an "n-by-n" order to sequentially supply them to the 2n-number of data lines DL1*l* to DL1*n* and DL2*l* to DL2*n*. For example, the pixel data re-arranger 29 rearranges the 2n-number of pixel data VD such that the pixel data VD supplied in the "n-by-n" order includes pixel data to be supplied to first and second output buffer IC's 48A and 48B in a $$“\frac{1}{2}\text{n-by-}\frac{1}{2}\text{n}”$$

order.

Furthermore, the pixel data re-arranger 29 may divide the pixel data VD into even pixel data VDeven and odd pixel data VDodd, thereby reducing transmission frequency, and simultaneously output the even pixel data VDeven and the odd pixel data VDodd via each transmission line. Accordingly, each of the even pixel data VDeven the odd pixel data VDodd may include red (R), green (G) and blue (B) pixel data. In particular, the pixel data re-arranger 29 may modulate the pixel data VD such that the pixel data VD, which has a transited bit number exceeding a reference value, may have a reduced transition bit number so as to minimize an electromagnetic interference (EMI) upon transmission, and then the pixel data re-arranger 29 may output the modulated pixel data VD.

The 2n-number of pixel data to be supplied to the 2n-number of data lines DL1*l* to DL1*n* and DL2*l* to DL2*n* may be input to the DAC IC 30 in the time-divided "n-by-n" order. The DAC IC 30 may physically divide the n-number of pixel voltage signals converted into the analog signals in the $$“\frac{1}{2}\text{n-by-}\frac{1}{2}\text{n}”$$

order to simultaneously apply them to the first and second output buffer IC's 48A and 48B. Then, the DAC IC 30 may repeat the DAC operation with respect to the remaining n-number of pixel data input during a subsequent time period. Accordingly, the DAC IC 30 may include a shift register part 36 for applying a sequential sampling signal, a latch part 38 for sequentially latching and outputting the pixel data VD in response to the sampling signal, and a digital-to-analog converter (DAC) 40 for converting the pixel data VD from the latch part 38 into a pixel signal. Furthermore, the DAC IC 30 may include a signal controller 32 for interfacing various control signals from a timing controller 28 and the pixel data VD, and a gamma voltage part 34 for supplying positive and negative gamma voltages required in the DAC 40.

The signal controller 32 may control various control signals including SSP, SSC, SOE, REV and POL, for example, received from the timing controller 28 and the pixel data VD in order to output the control signals to corresponding elements. The gamma voltage part 34 may sub-divide a plurality of gamma reference voltages received from a gamma reference voltage generator (not shown) for each gray level, and output the sub-divided plurality of gamma reference voltages.

The shift register part 36 may include an n-number of shift registers that sequentially shift a source start pulse SSP received from the signal controller 32 in response to a source sampling clock signal SSC to output the source start pulse SSP as a sampling signal.

The latch part 38 may sequentially sample the pixel data VD received from the signal controller 32 by a certain unit in response to the sampling signal received from the shift register part 36 to latch the pixel data VD. Accordingly, the latch part 38 may comprise an n-number of latches for latching an n-number of the pixel data VD, each having a size corresponding to a bit number (i.e., 3 bits or 6 bits) of the pixel data VD. The latch part 38 may simultaneously latch the even pixel data VDeven and the odd pixel data VDodd applied via the signal controller 32, i.e., 6 pixel data for each sampling signal. Subsequently, the latch part 38 may simultaneously output the n-number of pixel data VD in response to a first source output enable signal SOE1 received from the signal controller 32. Accordingly, the latch part 32 may restore the pixel data VD modulated to have a reduced transition bit number in response to a data inversion selecting signal REV, and then the latch part 32 outputs the pixel data VD.

The DAC 40 may simultaneously convert the n-number of pixel data VD received from the latch part 38 into positive and negative pixel signals, and may selectively output the positive and negative pixel voltage signals in response to a polarity control signal POL. Accordingly, the DAC 40 may include a positive (P) decoding part 42 and a negative (N) decoding part 44 that may be commonly connected to the latch part 38, and a multiplexor (MUX) 46 for selecting output signals of the P decoding part 42 and the N decoding part 44.

The P decoding part 42 may include an n-number of P decoders that convert the n-number of pixel data VD simultaneously input from the latch part 38 into positive pixel signals according to positive gamma voltages received from the gamma voltage part 34. The N decoding part 44 may include an n-number of N decoders that convert the n-number of pixel data VD simultaneously input from the latch part 38 into negative pixel signals according to negative gamma voltages received from the gamma voltage part 34. The multiplexor 46 may respond to a polarity control signal POL received from the signal controller 32 to selectively output the positive pixel signals from the P decoding part 42 or the negative pixel signals from the N decoding part 44. Specifically, a $$\frac{1}{2}\text{n-number}$$

of output channels of the multiplexor 46 may be connected to the first output buffer IC 48A, while a remaining $$\frac{1}{2}\text{n-number}$$

of output channels of the multiplexor 46 may be connected to the second output buffer IC 48B. Accordingly, the n-number of pixel voltage signals output from the multiplexor 46 may be separated into a $$\frac{1}{2}\text{n-number}$$

of signals to be simultaneously applied to the first and second output buffer IC's 48A and 48B.

Each of the first and second output buffer IC's 48A and 48B may sample and hold the pixel signals input in the $$\text{“}\frac{1}{2}\text{n-by-}\frac{1}{2}\text{n”}$$

order from the DAC IC 30 to simultaneously output the pixel signals to the n-number of data lines DL11 to DL1n or DL21 to DL2n. Accordingly, the first or second output buffer IC 48A or 48B may comprise a demultiplexor 50A or 50B and an output buffer part 52A or 52B. Each of the demultiplexors 50A and 50B may allow each of the $$\frac{1}{2}\text{n-number}$$

of pixel voltage signals simultaneously input from the DAC IC 30 to be selectively applied to an n-number of output buffer cells included in the output buffer parts 52A and 52B in response to a source input enable signal SIE received from the timing controller 28.

Each of the output buffer parts 52A and 52B may sequentially input and hold the $$\frac{1}{2}\text{n-number}$$

of pixel voltage signals received from each of the demultiplexor 50A and 50B. If the $$\frac{1}{2}\text{n-number}$$

of pixel voltage signals are input to each output buffer part 52A and 52B to input and hold all the n-number of pixel voltage signals, then the n-number of pixel voltage signals held are simultaneously applied to the corresponding data lines DL11 to DL1n and DL21 to DL2n in response to a second source output enable signal SEO2 received from the timing controller 28. Each of the output buffer parts 52A and 52B may comprise the n-number of output buffer cells connected to the corresponding data lines DL11 to DL1n and DL21 to DL2n at a one-to-one relationship.

Figure 4:
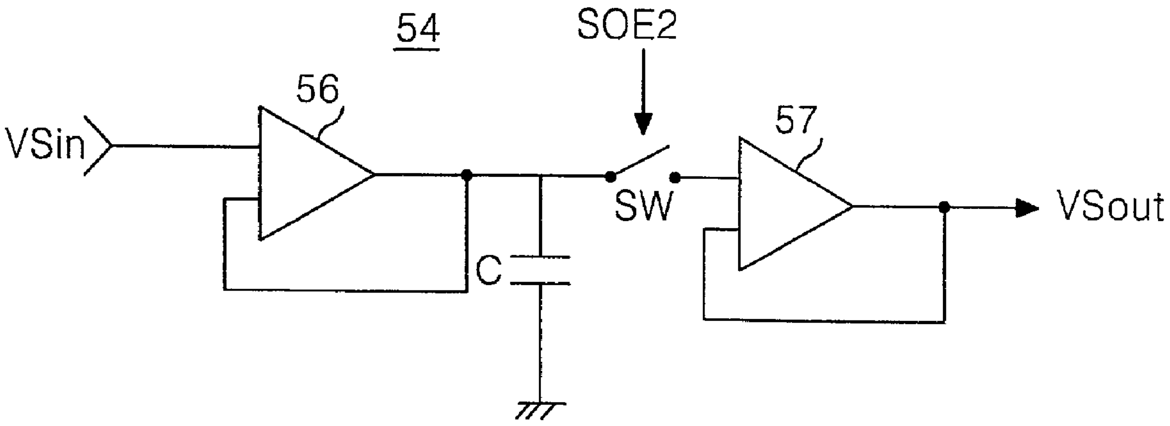
FIG. 4 is a detailed circuit diagram of the exemplary output buffer cell included in the output buffer shown in FIG. 3 according to the present invention.

FIG. 4 is a detailed circuit diagram of the exemplary output buffer cell included in the output buffer shown in FIG. 3 according to the present invention. In FIG. 4, each output buffer cell may include a first voltage follower 56 for buffering and outputting an input pixel voltage signal VSin, a capacitor C for holding a pixel voltage signal from the first voltage follower 56, a switching device SW for outputting the pixel voltage signal held in the capacitor C in response to a source output enable signal SOE2 received from the timing controller 38, and a second voltage follower 57 connected to the switching device SW to buffer the pixel voltage signal and output the buffered voltage signal as an output pixel voltage signal VSout. Accordingly, the capacitor C may be connected between an output terminal of the first voltage follower 56 and a ground voltage source or an input terminal of the first voltage follower 56 and the ground voltage source.

Figure 5:
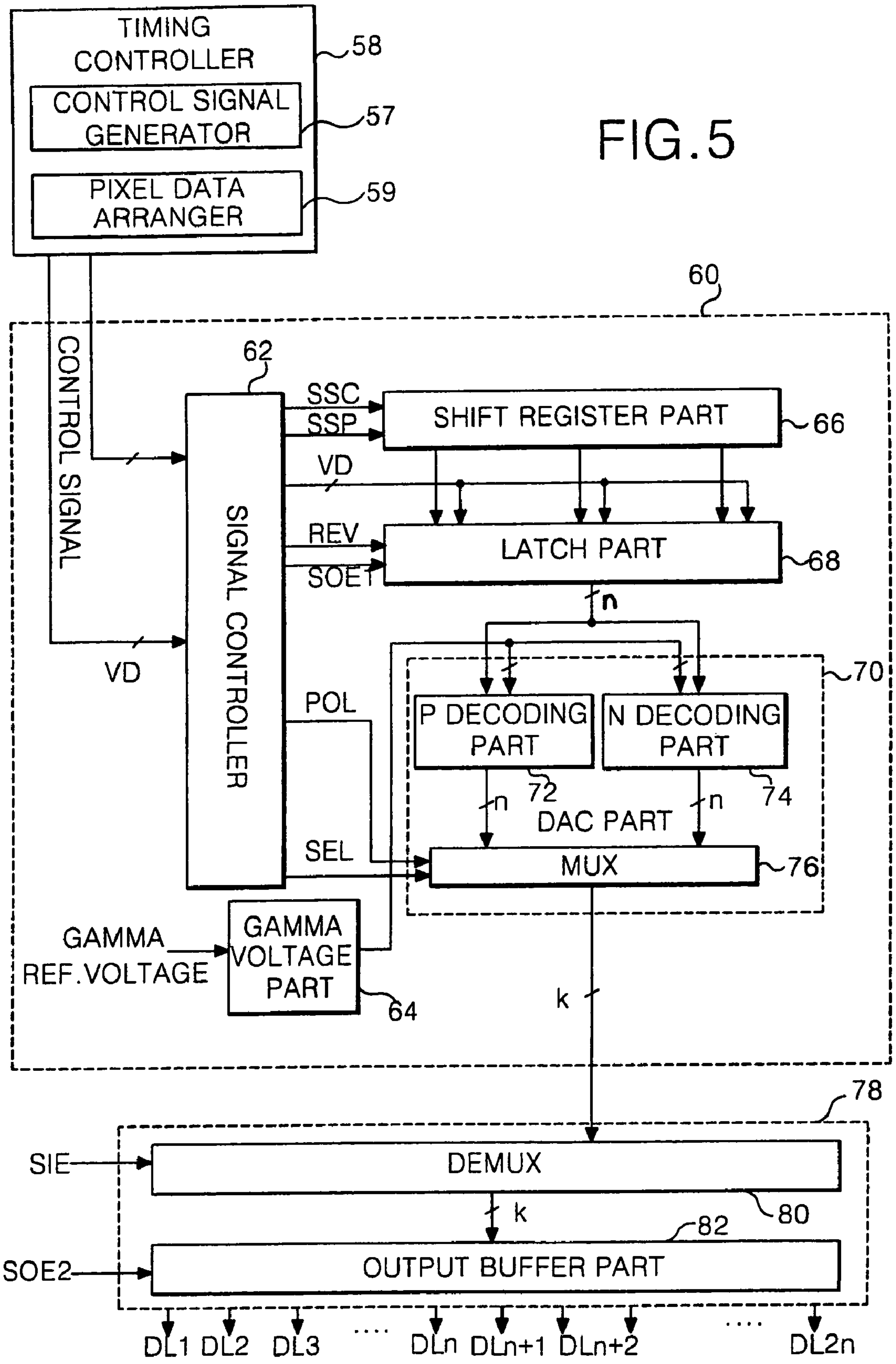
FIG. 5 is a block diagram showing another exemplary configuration of a data driving unit for a liquid crystal display according to the present invention.

FIG. 5 is a block diagram showing another exemplary configuration of a data driving unit for a liquid crystal display according to the present invention. The exemplary data driving unit connected to a timing controller 58 in FIG. 5 is different from the exemplary data driving unit connected to the timing controller 28 in FIG. 3 in that one output buffer IC 78 has a 2n-number of output channels. In FIG. 5, the timing controller 58 may supply various control signals for controlling the data driving unit and pixel data VD. Accordingly, the timing controller 58 may include a control signal generator 57 and a pixel data arranger 59. The control signal generator 57 may generate various control signals such as SSP, SSC, SOE1, REV, POL, SIE, and SOE2, for example, for controlling the data driving unit in accordance with external vertical and horizontal synchronizing signals and external dot clock signals. The pixel data arranger 59 may make an n-number time-divisions of a 2n-number of pixel data VD, and sequentially supply the time-divided data to a 2n-number of data lines DL11 to DL1*n* and DL2*l* to DL2*n*. Furthermore, the pixel data arranger 59 may divide the pixel data VD into even pixel data VDeven and odd pixel data VDodd, thereby reducing a transmission frequency, and simultaneously output the even pixel data VDeven and odd pixel data VDodd via each transmission line. Accordingly, each of the even pixel data VDeven and the odd pixel data VDodd may include red (R), green (G) and blue (B) pixel data. In particular, the pixel data arranger 59 may modulate the pixel data VD, which has a transited bit number that exceeds a reference value, and output the modulated pixel data VD. Thus, the pixel data VD has a reduced transition bit number, thereby minimizing an electromagnetic interference (EMI) upon data transmission.

The 2n-number of pixel data to be supplied to the 2n-number of data lines DL11 to DL1*n* and DL2*l* to DL2*n* may be input to the DAC IC 60 in a time-divided "n-by-n" order. The DAC IC 60 may convert an n-number of pixel data previously input as analog pixel voltage signals. The DAC IC 60 may time-divide the n-number of pixel voltage signals converted into the analog signals in a "k-by-k" order and simultaneously apply the analog signals to the output buffer IC 78. Then, the DAC IC 60 may repeat the operation with respect to the remaining n-number of pixel data input at a next time period.

The DAC IC 60 may include a shift register part 66 for applying a sequential sampling signal, a latch part 68 for sequentially latching and simultaneously outputting pixel data VD in response to the sampling signal, and a digital-to-analog converter (DAC) 70 for converting the pixel data VD received from the latch part 38 into a pixel voltage signal. Furthermore, the DAC IC 60 may include a signal controller 62 for interfacing various control signals received from a timing controller 58 and the pixel data VD, and a gamma voltage part 64 for supplying positive and negative gamma voltages required in the DAC 70.

The signal controller 62 may control the various control signals received from the timing controller 58 and the pixel data VD in order to output the various control signals to corresponding elements. The gamma voltage part 64 may sub-divide a plurality of gamma reference voltages input from a gamma reference voltage generator (not shown) for each gray level, and then output the sub-divided gamma reference voltages.

The shift register part 66 may includes an n-number of shift registers that sequentially shift a source start pulse SSP received from the signal controller 62 in response to a source sampling clock signal SSC to output the source start pulse SSP as a sampling signal.

The latch part 68 may sequentially sample the pixel data VD received from the signal controller 62 in response to the sampling signal received from the shift register part 66 to latch the pixel data VD. Accordingly, the latch part 68 may comprise an n-number of latches for latching the n-number of pixel data VD, each of which has a size corresponding to a bit number (i.e., 3 bits or 6 bits) of the pixel data VD. The latch part 68 may simultaneously latch the even pixel data VDeven and the odd pixel data VDodd applied via the signal controller 62, i.e., 6 pixel data for each sampling signal. Subsequently, the latch part 68 may simultaneously output the n-number of pixel data VD in response to a first source output enable signal SOE1 received from the signal controller 62. Accordingly, the latch part 62 may restore the pixel data VD modulated to have a reduced transition bit number in response to a data inversion selecting signal REV, and then the latch part 62 may output the pixel data VD.

The DAC 70 may simultaneously convert the n-number of pixel data VD received from the latch part 68 into positive and negative pixel signals, and selectively output the positive and negative pixel voltage signals in response to a polarity control signal POL. Accordingly, the DAC 70 may include a positive (P) decoding part 72 and a negative (N) decoding part 74 that are commonly connected to the latch part 68, and a multiplexor (MUX) 76 for selecting output signals of the P decoding part 72 and the N decoding part 74.

The P decoding part 72 may include an n-number of P decoders that convert the n-number of pixel data simultaneously input from the latch part 68 into positive pixel signals in accordance with positive gamma voltages received from the gamma voltage part 64. The N decoding part 74 may include an n-number of N decoders that convert the n-number of pixel data simultaneously input from the latch part 68 into negative pixel signals in accordance with negative gamma voltages received from the gamma voltage part 64. The multiplexor 76 may respond to a polarity control signal POL received from the signal controller 62 to selectively output the positive pixel signals received from the P decoding part 72 or the negative pixel signals received from the N decoding part 74, and respond to a selection control signal SEL to output the n-number of pixel voltage signals in a "k-by-k" order. Accordingly, the bit number of the selection control signal SEL may be determined depending upon a frequency "j" by which the n-number of pixel voltage signals are divided. For example, if the n-number of pixel voltage signals are output divided by 8 (i.e., j=8), then the selection control signal SEL may have 3 bits. As previously described, the DAC 70 may convert each of the n-number of pixel data into the n-number of pixel voltage signals, and output a k-number of time-divisions of the n-number of pixel voltage signals (wherein k is smaller than n).

The output buffer IC 78 may sample and hold the pixel voltage signals input, which has been received from the DAC IC 60 in the "k-by-k" order, to simultaneously output the pixel voltage signals to the n-number of data lines of the 2n-number of data lines DL1 to DL2n. Accordingly, the output buffer IC 78 may comprise a demultiplexor 80 and an output buffer part 82.

The demultiplexor 80 may allow pixel voltage signals input, which is received in the "k-by-k" order from the multiplexor 76, to be selectively applied to an n-number of output buffer cells of the 2n-number of output buffer cells included in the output buffer part 82 in the "k-by-k" order in response to a source input enable signal SIE received from the timing controller 58. Accordingly, the source input enable signal SIE may also have a bit number that corresponds to the frequency "j" in which the n-number of pixel voltage signals are divided similar to the selection control signal SEL.

The output buffer part 82 may have a configuration as shown in FIG. 5, and may include a 2n-number of output buffer cells connected to the 2n-number of data lines DL1 to DL2n at a one-to-one relationship. The output buffer part 82 may sequentially input each of the k-number of pixel voltage signals applied from the demultiplexor 80 to hold the n-number of pixel voltage signals. The n-number of output buffer cells holding the n-number of pixel voltage signals may repeat the operation to maintain such a hold state until all the remaining pixel voltage signals are input to the remaining n-number of output buffer cells. If the 2n-number of pixel voltage signals are input to the output buffer part 82 in the "k-by-k" order such that all the 2n-number of pixel voltage signals can be input and held, then the held 2n-number of pixel voltage signals are simultaneously applied to the 2n-number of data lines DL1 to DL2n in response to a second source output enable signal SOE2 received from the timing controller 58.

Figure 6:
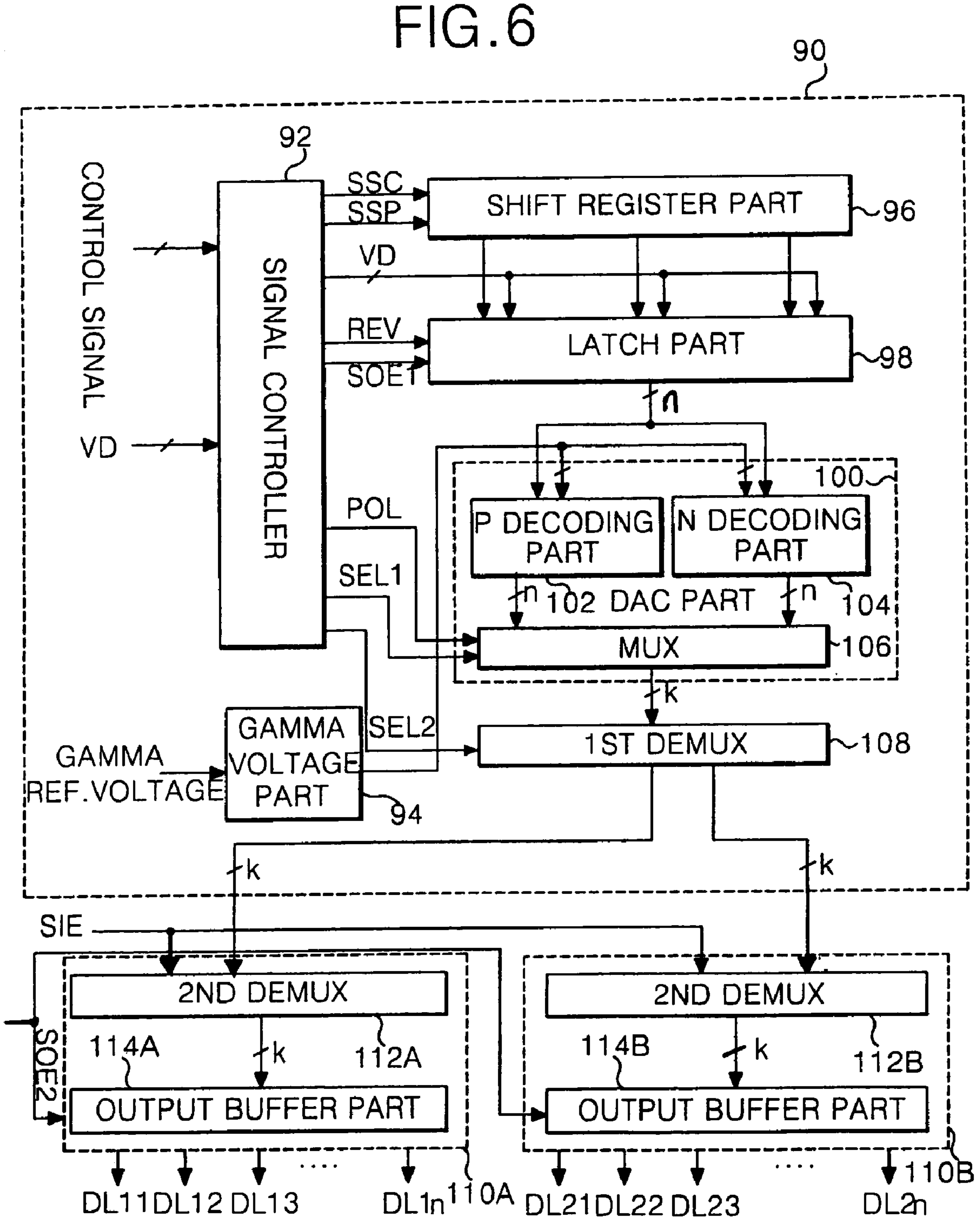
FIG. 6 is a block diagram showing another exemplary configuration of a data driving unit for a liquid crystal display according to the present invention.

FIG. 6 is a block diagram showing another exemplary configuration of a data driving unit for a liquid crystal display according to the present invention. Initially, the exemplary data driving unit shown in FIG. 6 may have elements similar to elements of the exemplary data driving unit shown in FIG. 3, except that an output terminal of a DAC IC 90 may further include a first demultiplexor 108 for sequentially driving a first output buffer IC 110A and a second output buffer IC 110B.

In addition, the exemplary data driving unit shown in FIG. 6 may be controlled in a similar control method as the exemplary timing controller 58 shown in FIG. 5. As previously described, the exemplary timing controller 58 may supply various control signals for controlling the data driving unit and pixel data VD. Accordingly, the timing controller 58 may include a control signal generator 55 and a pixel data arranger 59. The control signal generator 55 may generate various control signals such as SSP, SSC, SOE1, REV, POL, SEL1, SEL2, SIE, and SOE2, for example, for controlling the data driving unit in accordance with external vertical and horizontal synchronizing signals and external dot clock signals. The pixel data arranger 59 may make an n-number of time-divisions of a 2n-number of pixel data VD to be sequentially supplied to a 2n-number of data lines DL11 to DL1*n* and DL21 to DL2n. Furthermore, the pixel data arranger 59 may divide the pixel data VD into even pixel data VDeven and odd pixel data VDodd, thereby reducing a transmission frequency, and simultaneously output the even pixel data VDeven and the odd pixel data VDodd via each transmission line. Accordingly, each of the even pixel data VDeven the odd pixel data VDodd may include red (R), green (G) and blue (B) pixel data. In particular, the pixel data arranger 59 may modulate the pixel data VD, which has a transited bit number that exceeds a reference value, and output the modulated pixel data VD. Thus, the pixel data VD may have a reduced transition bit number, thereby minimizing an electromagnetic interference (EMI) upon data transmission.

The 2n-number of pixel data to be supplied to the 2n-number of data lines DL11 to DL1*n* and DL21 to DL2n may be input to a DAC IC 90 in a time-divided "n-by-n" order. The DAC IC 90 may convert an n-number of pixel data previously input as analog pixel voltage signals. The DAC IC 90 may time-divide the n-number of pixel voltage signals converted into the analog signals in a "k-by-k" order (wherein k<n) to selectively apply the time-divided n-number of pixel voltage signals to the first and second output buffer IC's 110A and 110B.

The DAC IC 90 may include a shift register part 96 for applying a sequential sampling signal, a latch part 98 for sequentially latching and simultaneously outputting pixel data VD in response to the sampling signal, and a digital-to-analog converter (DAC) 100 for converting the pixel data VD received from the latch part 98 into a pixel voltage signal, and a first demultiplexor 108 for selectively applying the pixel voltage signal received from the DAC 100 to the first and second output buffer IC's 110A and 110B. Furthermore, the DAC IC 90 may include a signal controller 92 for interfacing various control signals received from a timing controller 58 and the pixel data VD, and a gamma voltage part 94 for supplying positive and negative gamma voltages required in the DAC 100.

The signal controller 92 may control various control signals such CLK, SSP, SSC, SOE, REV, POL, SEL1, and SEL2, for example, received from the timing controller 58 and the pixel data VD in order to output the various control signals to corresponding elements. The gamma voltage part 94 may sub-divide a plurality of gamma reference voltages input from a gamma reference voltage generator (not shown) for each gray level, and then output the sub-divided gamma reference voltages.

The shift register part 96 may include an n-number of shift registers that sequentially shift a source start pulse SSP received from the signal controller 92 in response to a source sampling clock signal SSC to output the source start pulse SSP as a sampling signal.

The latch part 98 may sequentially sample the pixel data VD received from the signal controller 92 in response to the sampling signal received from the shift register part 96 to latch the pixel data VD. Accordingly, the latch part 98 may comprise an n-number of latches for latching an n-number of pixel data VD, each of which has a size corresponding to a bit number (i.e., 3 bits or 6 bits) of the pixel data VD. The latch part 98 may simultaneously latch the even pixel data VDeven and the odd pixel data VDodd applied via the signal controller 92, i.e., 6 pixel data for each sampling signal. Subsequently, the latch part 98 may simultaneously output the n-number of pixel data VD in response to a first source output enable signal SOE1 received from the signal controller 92. Accordingly, the latch part 92 may restore the pixel data VD modulated to have a reduced transition bit number in response to a data inversion selecting signal REV, and then the latch part 98 outputs the pixel data VD.

The DAC 100 may simultaneously convert the n-number of pixel data VD received from the latch part 98 into positive and negative pixel signals, and separately output the positive and negative pixel signals in a "k-by-k" order in response to a polarity control signal POL and a first selection control signal SELL. Accordingly, the DAC 100 may include a positive (P) decoding part 102 and a negative (N) decoding part 104 that are commonly connected to the latch part 98, and a multiplexor (MUX) 106 for selecting output signals of the P decoding part 102 and the N decoding parts 104.

The P decoding part 102 may include an n-number of P decoders that simultaneously convert the n-number of pixel data input from the latch part 98 into positive pixel signals in accordance with positive gamma voltages received from the gamma voltage part 94. The N decoding part 104 may include an n-number of N decoders that simultaneously convert the n-number of pixel data input from the latch part 98 into negative pixel signals in accordance with negative gamma voltages received from the gamma voltage part 94. The multiplexor 106 may respond to a polarity control signal POL received from the signal controller 92 to selectively output the positive pixel signals received from the P decoding part 102 or the negative pixel signals received from the N decoding part 104, and responds to a first selection control signal SELL to output the n-number of pixel voltage signals in the "k-by-k" order. Accordingly, the bit number of the first selection control signal SEL1 may be determined depending upon a frequency "j" by which the n-number of pixel voltage signals are divided. For example, if the n-number of pixel voltage signals are output divided by 8 (i.e., j=8), then the first selection control signal SEL1 may have 3 bits. As previously described, the DAC 100 may convert each the n-number of pixel data into the n-number of pixel voltage signals, and separate the n-number of pixel voltage signals in the "k-by-k" order (wherein k is smaller than n).

The first demultiplexor 108 may output each k-number of pixel voltage signals input from the multiplexor 106 to the first output buffer IC 110A or the second output buffer IC 110B in response to a second selection control signal SEL2 input from the signal controller 92. Accordingly, since the second selection control signal SEL2 may also be determined depending upon a frequency "j" by which the n-number of pixel voltage signals are divided, the first selection control signal SEL1 may have a same bit number.

Each of the first and second output buffer IC's 110A and 110B may sample and hold the pixel voltage signals input in the "k-by-k" order received from the DAC IC 90 to simultaneously output the pixel voltage signals to the n-number of data lines DL11 to DL1*n* or DL21 to DL2n. Accordingly, the first output buffer IC 110A or the second output buffer IC 110B may comprise a second demultiplexor 112A or 112B and an output buffer part 114A or 114B.

Each of the second demultiplexors 112A and 112B may allow pixel voltage signals input in the "k-by-k" order received from the first demultiplexor 108 to be selectively applied to the n-number of output buffer cells included in the output buffer parts 114A and 114B in the "k-by-k" order in response to a source input enable signal SIE received from the timing controller 58.

Each of the output buffer parts 114A and 114B may comprise an n-number of output buffer cells having a configuration as shown in FIG. 4, and may be connected to the corresponding data lines DL11 toDL21 and DL21 to DL2n at a one-to-one relationship. Each of the output buffer parts 114A and 114B may sequentially input and hold each of the k-number of pixel voltage signals applied from each demultiplexor 112A and 112B. If the 2n-number of pixel voltage signals are input to the output buffer part 82 in the "k-by-k" order such that all the 2n-number of pixel voltage signals can be input and held, then the held 2n-number of pixel voltage signals are simultaneously applied to the corresponding data lines DL11 to DL1*n* and DL21 to DL2n in response to a second source output enable signal SOE2 received from the timing controller 58.

Figure 7:
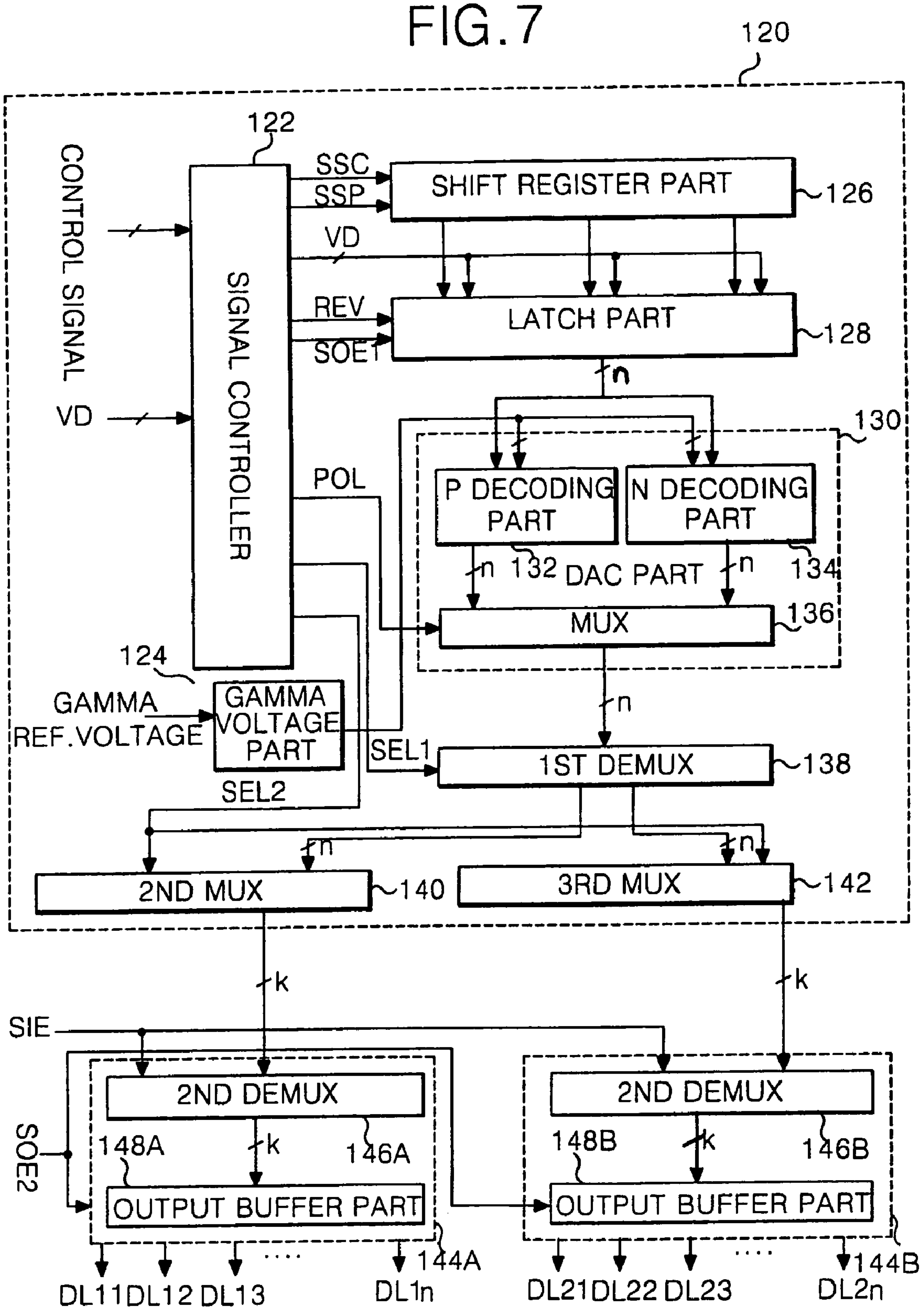
FIG. 7 is a block diagram showing another exemplary configuration of a data driving unit for a liquid crystal display according to the present invention.

FIG. 7 is a block diagram showing another exemplary configuration of a data driving unit for a liquid crystal display according to the present invention. Initially, the exemplary data driving unit shown in FIG. 7 may have similar elements as the exemplary data driving unit shown in FIG. 3. However, the exemplary data driving unit shown in FIG. 7 may further include two second multiplexors 140 and 142 for carrying out a division function of an n-number of pixel voltage signals of the multiplexor 106 shown in FIG. 6.

In addition, the exemplary data driving unit shown in FIG. 7 may be controlled in a similar control method as the timing controller 58 shown in FIG. 5. As previously described, the timing controller 58 may supply various control signals for controlling the data driving unit and pixel data VD. Accordingly, the timing controller 58 may include a control signal generator 55 and a pixel data arranger 59. The control signal generator 55 may generate various control signals such as SSP, SSC, SOE1, REV, POL, SEL1, SEL2, SIE, and SOE2, for example, for controlling the data driving unit in accordance with external vertical and horizontal synchronizing signals and external dot clock signals. The pixel data arranger 59 may make an n-number of time-divisions of a 2n-number of pixel data VD to be sequentially supplied to a 2n-number of data lines DL11 to DL1*n* and DL21 to DL2n. Furthermore, the pixel data arranger 59 may divide the pixel data VD into even pixel data VDeven and odd pixel data VDodd, thereby reducing a transmission frequency, and simultaneously outputs the even pixel data VDeven and the odd pixel data VDodd via each transmission line. Accordingly, each of the even pixel data VDeven the odd pixel data VDodd may include red (R), green (G) and blue (B) pixel data. In particular, the pixel data arranger 59 may modulate the pixel data VD, which has a transited bit number that exceeds a reference value, and output the modulated pixel data VD. Thus, the pixel data VD may have a reduced transition bit number, thereby minimizing an electromagnetic interference (EMI) upon data transmission.

The 2n-number of pixel data to be supplied to the 2n-number of data lines DL11 to DL1*n* and DL21 to DL2n may be input to a DAC IC 120 in a time-divided "n-by-n" order. The DAC IC 120 may convert an n-number of pixel data previously input into analog pixel voltage signals. The DAC IC 120 may time-divide the n-number of pixel voltage signals converted into the analog signals in a "k-by-k" (wherein k<n) to selectively apply the time-divided n-number of pixel voltage signals to the first and second output buffer IC's 144A and 144B.

The DAC IC 120 may include a shift register part 126 for applying a sequential sampling signal, a latch part 128 for sequentially latching and simultaneously outputting pixel data VD in response to the sampling signal, and a digital-to-analog converter (DAC) 130 for converting the pixel data VD received from the latch part 128 into a pixel voltage signal, a first demultiplexor 138 for selectively applying the pixel voltage signal received from the DAC 130 to the two multiplexors 140 and 142, and second and third multiplexors 140 and 142 for making a time-division of the pixel voltage signals received from the first demultiplexor 138 and applying the time-divided pixel voltage signals to the respective first and second output buffer IC's 144A and 144B. Furthermore, the DAC IC 120 may include a signal controller 92 for interfacing various control signals from a timing controller 58 and the pixel data VD, and a gamma voltage part 124 for supplying positive and negative gamma voltages required in the DAC 130.

The signal controller 122 may control various control signals such as CLK, SSP, SSC, SOE, REV, POL, SEL1, and SEL2, for example, received from the timing controller 58 and the pixel data VD to output the various control signals to corresponding elements. The gamma voltage part 124 may sub-divide a plurality of gamma reference voltages input from a gamma reference voltage generator (not shown) for each gray level to output the sub-divided gamma reference voltages.

The shift register part 126 may include an n-number of shift registers that sequentially shift a source start pulse SSP received from the signal controller 122 in response to a source sampling clock signal SSC to output the source start pulse SSP as a sampling signal.

The latch part 128 may sequentially sample the pixel data VD received from the signal controller 122 in response to the sampling signal received from the shift register part 126 to latch the pixel data VD. Accordingly, the latch part 128 may comprise an n-number of latches for latching the n-number of pixel data VD, each of which has a size corresponding to a bit number (i.e., 3 bits or 6 bits) of the pixel data VD. The latch part 128 may simultaneously latch the even pixel data VDeven and the odd pixel data VDodd applied via the signal controller 122, i.e., 6 pixel data for each sampling signal. Subsequently, the latch part 128 may simultaneously output the n-number of pixel data VD in response to a first source output enable signal SOE1 received from the signal controller 122. Accordingly, the latch part 122 may restore the pixel data VD modulated to have a reduced transition bit number in response to a data inversion selecting signal REV, and then the latch part 128 may output the pixel data VD.

The DAC 130 may simultaneously convert the n-number of pixel data VD received from the latch part 128 into positive and negative pixel signals, and separately outputs the positive and negative pixel signals. Accordingly, the DAC 130 may include a positive (P) decoding part 132 and a negative (N) decoding part 134 that are commonly connected to the latch part 128, and a multiplexor (MUX) 136 for selecting output signals of the P decoding part 132 and the N decoding part 134.

The P decoding part 132 may include an n-number of P decoders that convert the n-number of pixel data simultaneously input from the latch part 128 into positive pixel signals in accordance with positive gamma voltages received from the gamma voltage part 124. The N decoding part 134 may include an n-number of N decoders that convert the n-number of pixel data simultaneously input from the latch part 128 into negative pixel signals in accordance with negative gamma voltages received from the gamma voltage part 124. The first multiplexor 136 may respond to a polarity control signal POL received from the signal controller 122 to selectively output the positive pixel signals received from the P decoding part 132 or the negative pixel signals received from the N decoding part 134 in an "n-by-n" order.

The first demultiplexor 130 may selectively output the n-number of pixel voltage signals input from the first multiplexor 136 to the second and third multiplexors 140 and 142 in response to a first selection control signal SEL1 input from the signal controller 122. The first selection control signal SELL may have a logical value inverted every period when a source output enable signal SOE is applied to the latch part 128, thereby selectively outputting each of the n-number of pixel voltage signal to the two multiplexors 140 and 142.

Each of the second and third multiplexors 140 and 142 may output each of the n-number of pixel voltage signals received from the first demultiplexor 138 in a "k-by-k" order in response to a second selection control signal SEL2 received from the signal controller 122. Accordingly, the bit number of the second selection control signal SEL2 may be determined depending upon a frequency "j" by which the n-number of pixel voltage signals are divided. For example, if the n-number of pixel voltage signals are output divided by 8 (i.e., j=8), then the second selection control signal SEL2 may have 3 bits.

Each of the first and second output buffer IC's 144A and 144B may sample and hold the pixel voltage signals input in the "k-by-k" order received from the second and third multiplexors 140 and 142 of the DAC IC 120 to simultaneously output the pixel voltage signals to the n-number of data lines DL11 to DL**1*n* or DL21 to DL2n. Accordingly, the first or second output buffer IC's 144A or 144B may comprise a second demultiplexor 146A or 146B and an output buffer part 148A or 148**B.

Each of the second demultiplexors 146A and 146B may allow pixel voltage signals input in the "k-by-k" order received from each of the second and third multiplexors 140 and 142 to be selectively applied to the n-number of output buffer cells included in the output buffer parts 148A and 148B in the "k-by-k" order in response to a source input enable signal SIE received from the timing controller 58.

Each of the output buffer parts 148A and 148B may comprise an n-number of output buffer cells which may have a configuration as shown in FIG. 4 and may be connected to the corresponding data lines DL11 to DL21 and DL21 to DL2n at a one-to-one relationship. Each of the output buffer parts 148A and 148B may sequentially input and hold each of the k-number of pixel voltage signals applied from each demultiplexor 146A and 146B. If the n-number of pixel voltage signals are input to each of the output buffer part 148A and 148B in the "k-by-k" order such that all the n-number of pixel voltage signals can be input and held, then the held n-number of pixel voltage signals are simultaneously applied to the corresponding data lines DL11 to DL**1*n* and DL21 to DL2n in response to a second source output enable signal SOE2 received from the timing controller 58**.

As described above, the exemplary data driving units according to the present invention may be integrated separately into a DAC IC and a output buffer IC. Furthermore, one DAC IC may be driven on a time-division basis, at least two output buffer IC's each having an n-number of channels may be commonly connected to the DAC IC or an output buffer IC having a 2n-number of channels may be connected to the DAC IC so that the number of DAC IC's can be reduced by ⁄1;2. Moreover, the reduced number of DAC IC's may be mounted in the TCP and the output buffer IC's may be mounted in the liquid crystal panel by a CGO system, thereby reducing a total number of TCP's by ⁄1;2 in comparison to the prior art.

Figure 8:
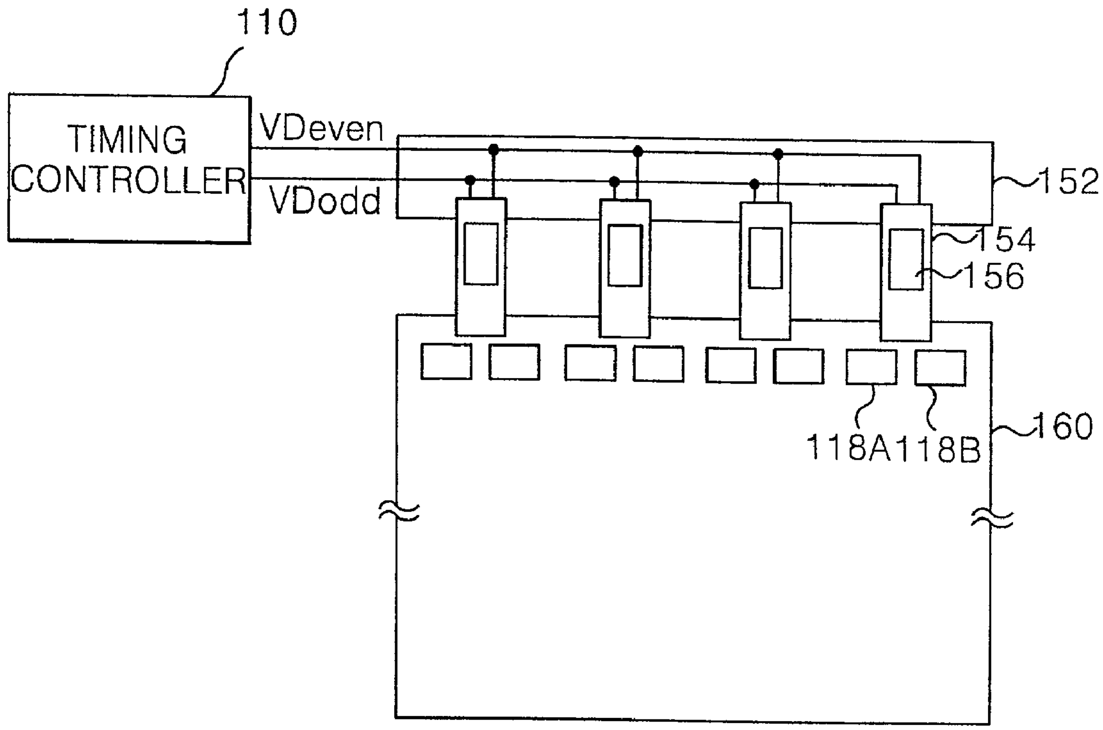
FIG. 8 is a schematic block diagram of an exemplary data driving apparatus for a liquid crystal display including the data driving unit according to the present invention.

FIG. 8 is a schematic block diagram of an exemplary data driving apparatus for a liquid crystal display including the data driving unit according to the present invention. Moreover, FIG. 8 illustrates a data driving apparatus of a liquid crystal display in which two output buffer IC's 118A and 118B may be commonly connected to each DAC IC 156 driven on a time-division basis. In FIG. 8, the DAC IC 156 may be mounted in a TCP 154, while the output buffer IC's 118A and 118B may be separately mounted in a liquid crystal display panel 160. The output buffer IC's 118A and 118B may be mounted in the liquid crystal display panel 160 by a CGO system. The TCP's 154 mounted with the DAC IC 156 may be electrically connected, via pads provided at an upper portion of the liquid crystal display panel 160, to the output buffer IC's 118A and 118B, and may be electrically connected to output pads provided at a data PCB 152. The data PCB 152 may transmit various control signals applied from a timing controller 110 and pixel data signals to the DAC IC's 156.

The timing controller 110 may divide the pixel data VD into even data VDeven and odd data VDodd, thereby reducing a transmission frequency. The timing controller 110 may output the even data VDeven and the odd data VDodd over each transmission line. The timing controller 110 may sequentially apply the even pixel data VDeven and the odd pixel data VDodd to a plurality of DAC IC's 156. Accordingly, if each of the output buffers 118A and 118B has an n-number of output channels, then the timing controller 110 makes an n-number of time-divisions of a 2n-number of pixel data to apply the time-divided pixel data to each of DAC IC's 156. Thus, since each DAC IC 156 must perform two DAC functions in an "n-by-n" order within one horizontal period, each DAC IC 156 should be driven at twice the speed of the prior art. Accordingly, the timing controller 110 may allow various control signals such as SSC, SSP, SOE, REV, and POL, for example, and pixel data VD applied to each of the DAC IC's 156 to have twice the frequency of the prior art. As previously described, only the DAC IC's 156 driven on a time-division basis are mounted in the TCP 154, so that the number of DAC IC's 156 and the number of TCP's 154 can be reduced to ⁄1;2, thereby lowering manufacturing cost.

Figure 9:
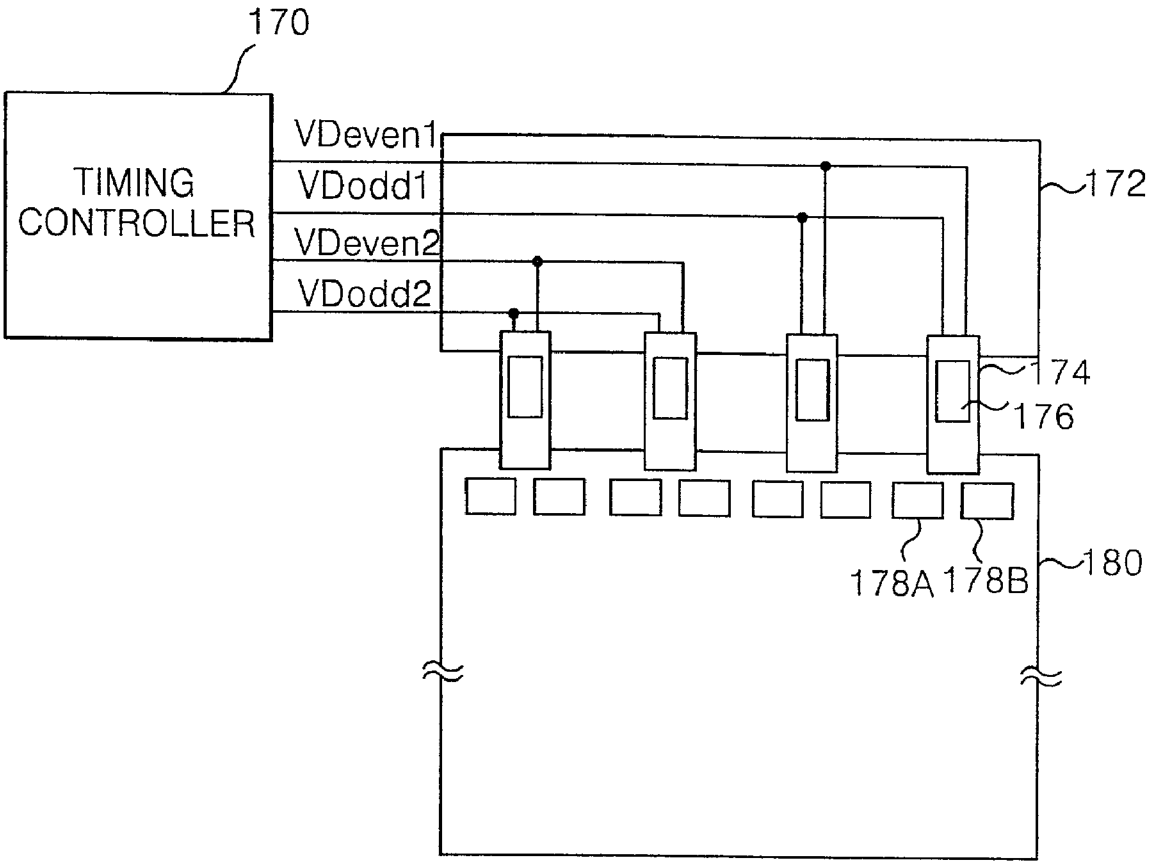
FIG. 9 is a schematic block diagram of another exemplary data driving apparatus for a liquid crystal display including the data driving unit according to the present invention.

Alternatively, in order not to increase a driving frequency of the DAC IC driven on a time-division basis into two times, a transmission line for applying the pixel data received from the timing controller 170 to the DAC IC 176 may be physically separated as shown in FIG. 9. Accordingly, a transmission line for transmitting the pixel data received from the timing controller 170 may be separated into a first even pixel data transmission line VDeven1, a first odd pixel data transmission line VDodd1, a second even pixel data transmission line VDeven2, and a second odd pixel data transmission line VDodd2. Accordingly, the first even pixel data transmission line VDeven1 and the first odd pixel data transmission line VDodd1 may be connected to two of four DAC IC's 174, while the second even pixel data transmission line VDeven2 and the second odd pixel data transmission line VDodd2 may be connected to the remaining two DAC IC's 174. Twice the number of data transmission lines may be provided and separately connected to the DAC IC's 174, so that the pixel data VD may be latched in the four DAC IC's 174 during a time at which the pixel data VD is latched in the two DAC IC's 174. As a result of shortening the latch time of the pixel data, the timing controller 170 may drive the DAC IC 176 with a same driving frequency as the prior art without any increase of the driving frequency in the data driving apparatus of the liquid crystal display panel shown in FIG. 8 even though the DAC IC 176 is driven on a time-division basis.

The output buffer IC's 178A and 178B may be commonly connected in pairs of two to each of the TCP's 174 mounted with the DAC IC 176 in a liquid crystal display panel 180 by the CGO system. Each of the TCP's 174 may be electrically connected to the output buffer IC's 178A and 178B via pads provided at an upper portion of the liquid crystal display panel 180, and may be electrically connected to output pads provided at a data PCB 172. The data PCB 172 may transmit various control signals applied from the timing controller 110 and pixel data signals to the DAC IC's 176.

Figure 10:
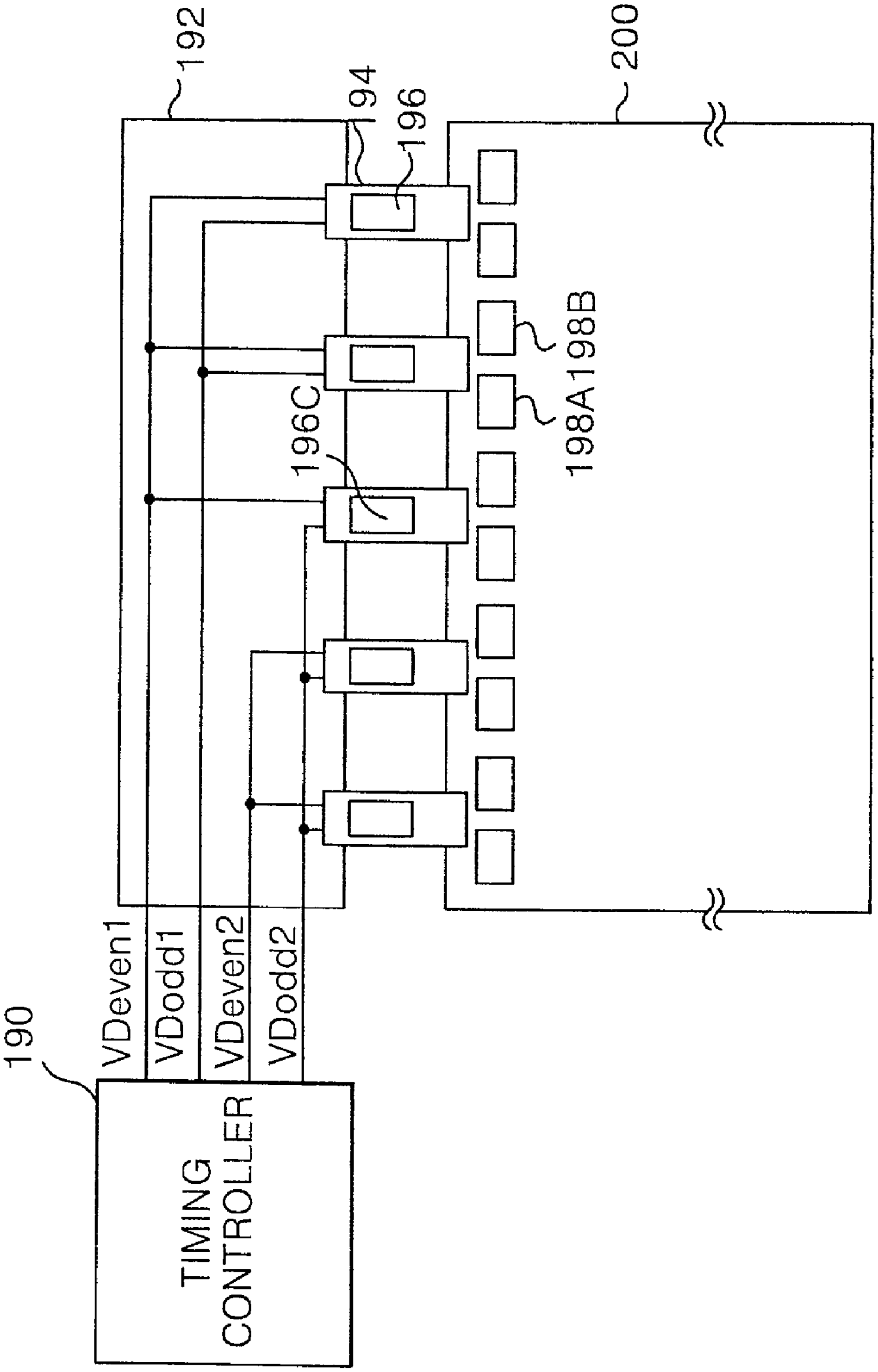
FIG. 10 is a schematic block diagram of another exemplary data driving apparatus for a liquid crystal display including the data driving unit according to the present invention.
Figure 11:
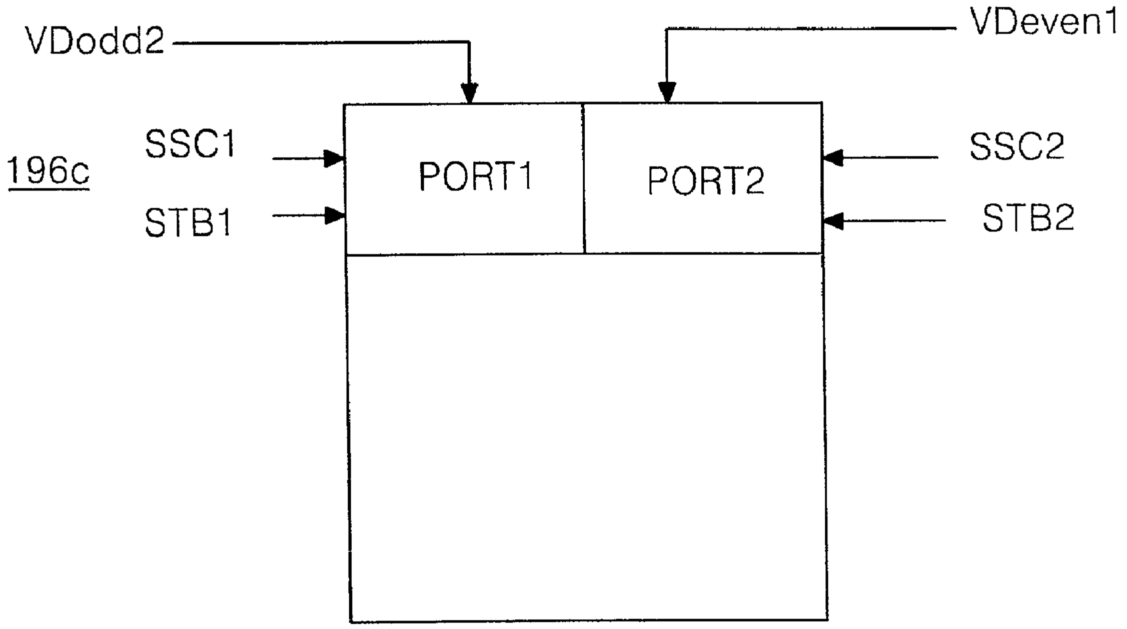
FIG. 11 is a schematic block diagram for explaining a mechanism of the third exemplary digital-to-analog converter integrated circuit shown in FIG. 10.

If a total number of DAC IC's 196 is reduced to an odd number, for example five as shown in FIG. 10, then one DAC IC 196C centrally positioned to the five DAC IC's 196 should receive the pixel data via each of port 1 and port 2 in FIG. 11 so as to separate the data transmission line as shown in FIG. 9. For example, if a liquid crystal display panel 200 is a SXGA mode (1280×1204 pixels), then 8 data driver IC's are required when a data driver IC provided with 480 channels is used; whereas 10 data driver IC's are required when a data driver IC is provided with 384 channels is used. In the present invention, the data driver IC's may be separated into the DAC IC and the output buffer IC and the DAC IC may be driven on a time-division basis, thereby reducing the total number of DAC IC's to one-half. Moreover, the present invention may require four DAC IC's with 480 channels or five DAC IC's with 384 channels. Accordingly, if four DAC IC's with 480 channels are used, then the data transmission lines should be divided by two as shown in FIG. 9 to separately drive the DAC IC's in a two-by-two order so as to prevent an increase in the driving frequency. However, the DAC IC with 480 channels is disadvantageous since it has a higher manufacturing cost than the DAC IC with 384 channels.

Accordingly, if five DAC IC's with 384 channels are used, then one DAC IC 195C of the five DAC IC's should have a data input port comprising port 1 and port 2 driven independently so as to prevent an increase in the driving frequency. In FIG. 10, the first and second DAC IC's 196 of the five DAC IC's 196 and 196C may be commonly connected to the second even pixel data (VDeven2) transmission line and the second odd pixel data transmission line VDodd2, while the fourth and fifth DAC IC's 196 may be commonly connected to the first even pixel data transmission line VDeven1 and the first odd pixel data transmission line VDodd1. In particular, the third DAC IC 196C may have port 1 and port 2 driven independently as shown in FIG. 11 for an input of the pixel data. The port 1 may be connected to the second odd pixel data transmission line VDodd2, while the port 2 may be connected to the first even pixel data transmission line VDeven1. The port 1 may receive odd pixel data inputted over the second odd pixel data transmission line VDodd2 in response to a first source sampling clock SSC1 and a first strobe enable signal STB1 from the timing controller 190. The port 2 may receive even pixel data inputted over the first even pixel data transmission line VDeven1 in response to a second source sampling clock SSC2 and a second strobe enable signal STB2 from the timing controller 190.

As described above, odd-numbered DAC IC's 196 and 196C may be separately connected to the data transmission lines divided by two, so that the pixel data VD can be latched in the five DAC IC's 196 and 196C during a time at which the pixel data VD is latched in the 2.5 DAC IC's. Since the latch time of the pixel data is shortened, the timing controller 190 can drive the DAC IC's 196 and 196C with the same driving frequency as the prior art without any increase of the driving frequency in the data driving apparatus of the liquid crystal display panel shown in FIG. 8 even though the DAC IC's 196 and 196C is driven on a time-division basis.

The output buffer IC's 198A and 198B may be commonly connected in pairs to each of the TCP's 194 mounted with the DAC IC's 196 and 196C in a liquid crystal display panel 200 by the CGO system. Each of the TCP's 194 may be electrically connected to the output buffer IC's 198A and 198B via pads provided at the upper portion of the liquid crystal display panel 200, and may be electrically connected to output pads provided at a data PCB 192. The data PCB 192 may transmit various control signals applied from the timing controller 190 and pixel data signals to the DAC IC's 196 and 196C.

As described above, according to the present invention, the DAC part may be driven on a time-division basis and the output buffer part may be separately mounted in the liquid crystal display panel, so that the number of DAC's and TCP's can be reduced to one-half, thereby lowering the manufacturing cost. Furthermore, the output buffer part may be separated from the data driver IC to have only a DAC function, so that a configuration of the driver IC can be simplified, thereby improving the throughput. In addition, according to the present invention, the data driver IC may be integrated separately into the DAC IC and the output buffer IC to enhance an accuracy of the IC, thereby improving a reliability in a driving of the IC.

It will be apparent to those skilled in the art that various modifications and variations can be made in the data driving apparatus and method for a liquid crystal display of the present invention without departing from the spirit or scope of the inventions. Thus, it is intended that the present invention covers the modifications and variations of this invention provided they come within the scope of the appended claims and their equivalents.

What is claimed is:

1. A data driving apparatus for a liquid crystal display, comprising:

a timing controller configured to make n-number of time divisions of 2n-number of pixel data (wherein n is an integer) to output the 2n-number of pixel data as n-number of time-divided input pixel data;

at least one digital-to-analog converter integrated circuit for receiving and converting the n-number of input pixel data into n-number of pixel voltage signals and making k-number of time-divisions of the n-number of pixel voltage signals to output k-number of time-divided pixel voltage signals (wherein k is an integer, and n>k); and at least one output buffer integrated circuit for holding and buffering the k-number of time-divided pixel voltage signals until all of 2n-number of pixel voltage signals have been received and simultaneously outputting the buffered pixel voltage signals to 2n-number of data lines, wherein the digital-to-analog converter integrated circuit is mounted on a tape carrier package connected to a liquid crystal display panel, and the output buffer integrated circuit is mounted on the liquid crystal display panel.

2. The data driving apparatus according to claim 1, wherein the digital-to-analog converter integrated circuit includes:

shift register means for sequentially outputting a sampling signal under control of the timing controller;

latch means for sequentially latching and subsequently outputting the n-number of input pixel data simultaneously under control of the timing controller and in response to the sampling signal; and a digital-to-analog converter for simultaneously converting the n-number of input pixel data into n-number of positive pixel voltage signals and n-number of negative pixel voltage signals in accordance with an input gamma voltage, and selecting the n-number of pixel voltage signals from among the positive and negative voltage signals in response to a polarity control signal received from the timing controller and time-dividing the n-number of pixel voltage signals in response to a selection control signal received from the timing controller to output the k-number of time-divided pixel voltage signals.

3. The data driving apparatus according to claim 1, wherein the output buffer integrated circuit includes: a demultiplexor for receiving each of the k-number of time-divided pixel voltage signals output from the digital-to-analog converter integrated circuit, and selectively outputting each of the k-number of time-divided pixel voltage signals in response to a source input enable signal received from the timing controller; and output buffer means connected to the 2n-number of data lines for holding and buffering the k-number of time-divided pixel voltage signals and outputting the held pixel voltage signals when all of the 2n-number of pixel voltage signals have been received.

4. A data driving apparatus for a liquid crystal display, comprising:

a timing controller configured to supply n-number of time-divided input pixel data into at least two regions, each comprising the n-number of input pixel data;

at least one digital-to-analog converter integrated circuit for receiving and converting the n-number of input pixel data into n-number of pixel voltage signals and making k-number of time-divisions of the n-number of pixel voltage signals to output k-number of time-divided pixel voltage signals (wherein n and k are integers, and n>k); and at least two output buffer integrated circuits commonly connected to the digital-to-analog converter integrated circuit for holding and buffering the k-number of time-divided pixel voltage signals, each output buffer integrated circuit outputting the buffered pixel voltage signals to n-number of data lines when n-number of time-divided pixel voltages have been received, wherein the digital-to-analog converter integrated circuit is mounted on a tape carrier package connected to a liquid crystal display panel, and each of the output buffer integrated circuits is mounted on the liquid crystal display panel.

5. The data driving apparatus according to claim 4, wherein the digital-to-analog converter integrated circuit includes:

shift register means for sequentially outputting a sampling signal under control of the timing controller;

latch means for sequentially latching and subsequently outputting the n-number of input pixel data simultaneously under control of the timing controller and in response to the sampling signal;

a digital-to-analog converter for simultaneously converting the n-number of input pixel data into n-number of positive pixel voltage signals and n-number of negative pixel voltage signals in accordance with an input gamma voltage, and selecting the n-number of pixel voltage signals from among the positive and negative pixel voltage signals in response to a polarity control signal received from the timing controller and time-dividing the n-number of pixel voltage signals in response to a first selection control signal received from the timing controller to output the k-number of time-divided pixel voltage signals; and a demultiplexor for receiving and selectively outputting the k-number of time-divided pixel voltage signals to the at least two output buffer integrated circuits in response to a second selection control signal received from the timing controller.

6. The data driving apparatus according to claim 5, wherein the first and second selection control signals have a bit number corresponding to a frequency by which the n-number of pixel voltage signals are time-divided into each of the k-number of time-divided pixel voltage signals.

7. The data driving apparatus according to claim 4, wherein the digital-to-analog converter integrated circuit includes:

shift register means for sequentially outputting a sampling signal under control of the timing controller;

latch means for sequentially latching and subsequently outputting the n-number of input pixel data simultaneously under control of the timing controller and in response to the sampling signal;

a digital-to-analog converter for simultaneously converting the n-number of input pixel data into n-number of positive pixel voltage signals and n-number of negative pixel voltage signals in accordance with an input gamma voltage, and selecting the n-number of pixel voltage signals from among the positive and negative pixel voltage signals in response to a polarity control signal received from the timing controller;

a demultiplexor for selectively outputting the selected n-number of pixel voltage signals to at least two output terminals in response to a first selection control signal received from the timing controller; and at least two multiplexors, being connected to respective ones of the at least two output terminals, for time-dividing the n-number of pixel voltage signals into the k-number of pixel voltage signals in response to a second selection control signal received from the timing controller.

8. The data driving apparatus according to claim 7, wherein the first selection control signal has a logical state inverted every time period of an output enable signal controlling an output of the latch means, and the second selection control signal has a bit number corresponding to a frequency by which the n-number of pixel voltage signals are time-divided into each of the k-number of time-divided pixel voltage signals.

9. The data driving apparatus according to claim 4, wherein each of the output buffer integrated circuits includes:

at least one demultiplexor for receiving each of the k-number of time-divided pixel voltage signals output from the digital-to-analog converter integrated circuit, and selectively outputting the k-number of time-divided pixel voltage signals in response to a source input enable signal received from the timing controller; and output buffer means connected to the n-number of data lines, for holding and buffering the k-number of time-divided pixel voltage signals input from the demultiplexor and outputting the held pixel voltage signals when n-number of pixel voltage signals have been received.

10. The data driving apparatus according to claim 9, wherein the source input enable signal has a bit number corresponding to a frequency by which the n-number of pixel voltage signals are time-divided into each of the k-number of time-divided pixel voltage signals.

11. The data driving apparatus according to claim 9, wherein each of the output buffer means includes an n-number of output buffer cells connected to the n-number of data lines, each of the output buffer cells including:

a first voltage follower connected in series to buffer an input pixel voltage signal;

holding means connected to any one of input and output terminals of the first voltage follower to hold the k-number of time-divided pixel voltage signals;

switching means for outputting the held pixel voltage signal in response to an output enable signal received from the timing controller; and a second voltage follower for buffering the pixel voltage signal output from the switching means.

12. The data driving apparatus according to claim 4, wherein the digital-to-analog converter integrated circuit includes:

a signal controller for interfacing control signals and pixel data received from the timing controller to each element of the digital-to-analog converter integrated circuit; and a gamma voltage generator for sub-dividing an input gamma reference voltage to generate the gamma voltage.

13. The data driving apparatus according to claim 4, wherein the timing controller applies the pixel data to the digital-to-analog converter integrated circuit over an odd pixel data transmission line and an even pixel data transmission line, and frequencies of the control signals applied from the timing controller to the digital-to-analog converter integrated circuit and the pixel data are increased to at least two times.

14. The data driving apparatus according to claim 4, further comprising a plurality of digital-to-analog converter integrated circuits, wherein the plurality of digital-to-analog converter integrated circuits are divided into first and second blocks, and the timing controller supplies the pixel data to the plurality of digital-to-analog converter integrated circuits involved in the first block over a first odd pixel data transmission line and a first even pixel data transmission line, and supplies the pixel data to the plurality of digital-to-analog converter integrated circuits involved in the second block over a second odd pixel data transmission line and a second even pixel data transmission line.

15. The data driving apparatus according to claim 14, wherein a total number of the plurality of digital-to-analog converter integrated circuits is odd, and any one of the plurality of digital-to-analog converter integrated circuits includes a first input port connected to any one of the first and second odd pixel data transmission lines and a second port connected to any one of the first and second even pixel data transmission lines, and the first and second input port are driven independently.

16. A data driving apparatus for a liquid crystal display, comprising:

a timing controller configured to re-arrange 2n-number of pixel data (wherein n is an integer) into at least two sets of n-number input pixel data and output the n-number of input pixel data by time-division;

at least one digital-to-analog converter integrated circuit for receiving and converting the n-number of input pixel data into pixel voltage signals and time-dividing the pixel voltage signals into $$\frac{1}{2}\text{ n-number}$$

of pixel voltage signals; and at least two output buffer integrated circuits commonly connected to the digital-to-analog converter integrated circuit for receiving and buffering the time-divided pixel voltage signals, each output buffer integrated circuit outputting the buffered pixel voltage signals to n-number of data lines when n-number of time-divided pixel voltages have been received, the timing controller further configured to control which of the output buffer integrated circuits receives the time-divided pixel voltage signals from the digital-to-analog converter integrated circuit in accordance with a sequence, wherein the digital-to-analog converter integrated circuit is mounted on a tape carrier package connected to a liquid crystal display panel, and each of the output buffer integrated circuits is mounted on the liquid crystal display panel.

17. The data driving apparatus according to claim 16, wherein the digital-to-analog converter integrated circuit includes:

shift register means for sequentially outputting a sampling signal under control of the timing controller;

latch means for sequentially latching and subseciuentlv outputting the n-number of input pixel data input simultaneously under control of the timing controller and in response to the sampling signal; and a digital-to-analog converter for simultaneously converting the n-number of input pixel data into n-number of positive pixel voltage signals and n-number of negative pixel voltage signals in accordance with an input gamma voltage, and selecting the n-number of pixel voltage signals from among the positive and negative pixel voltage signals in response to a polarity control signal received from the timing controller to apply the selected n-number of pixel voltage signals to the at least two output buffer circuit integrated circuits.

18. The data driving apparatus according to claim 16, wherein each of the output buffer integrated circuits includes:

at least one demultiplexor for receiving each of the divided pixel voltage signals output from the digital-to-analog converter integrated circuit and selectively outputting the received pixel voltage signals in response to a source input enable signal received from the timing controller; and output buffer means connected to the n-number of data lines for holding and buffering the pixel voltage signals input from the demultiplexor and outputting the held pixel voltage signals when n-number of pixel voltage signals have been received.

19. A method of driving a data driving apparatus for driving data lines arranged in a liquid crystal display panel, wherein the data driving apparatus includes a plurality of digital-to-analog converter integrated circuits connected to a timing controller and a plurality of output buffer integrated circuits connected to each of an n-number of data lines (wherein n is an integer) and connected to each of the plurality of digital-to-analog converter integrated circuits in at least two-by-two configuration, the method comprising:

re-arranging 2n-number of pixel data into first and second n-number of input pixel data and supplying an the first n-number of input pixel data from the timing controller to each of the plurality of digital-to-analog converter integrated circuits by time-division;

converting the first n-number of input pixel data input to each of the plurality of digital-to-analog converter integrated circuits into n-number of pixel voltage signals;

dividing the converted n-number of pixel voltage signals into $$\frac{1}{2}\text{ n-number}$$

of pixel voltage signals and outputting the divided pixel voltage signals to at least two output buffer integrated circuits;

holding the converted pixel voltage signals received into each of the at least two output buffer integrated circuits;

applying an the second n-number of input pixel data received from the timing controller to each of the plurality of digital-to-analog converter integrated circuits;

converting the second n-number of input pixel data input to each of the plurality of digital-to-analog converter integrated circuits into n-number of pixel voltage signals;

dividing the converted n-number of pixel voltage signals into $$\frac{1}{2}\text{ n-number}$$

of pixel voltage signals and outputting the divided pixel voltage signals to each of the at least two output buffer integrated circuits; and buffering the pixel voltage signals input into each of the at least two output buffer integrated circuits along with the held pixel voltage signals and simultaneously applying the buffered pixel voltage signals the held pixel voltage signals to the n-number of data lines.

20. A method of driving a data driving apparatus for driving data lines arranged in a liquid crystal display panel, wherein the data driving apparatus includes a plurality of digital-to-analog converter integrated circuits connected to a timing controller and a plurality of output buffer integrated circuits connected to each of the plurality of digital-to-analog converter integrated circuits and connected to each of a 2n-number of data lines (wherein n is an integer), the method comprising:

supplying a first n-number of input pixel data of 2n-number of input pixel data received from the timing controller to each of the plurality of digital-to-analog converter integrated circuits;

converting the first n-number of input pixel data input to each of the plurality of digital-to-analog converter integrated circuits into first pixel voltage signals;

dividing the first pixel voltage signals into k-number of pixel voltage signals and outputting the divided first pixel voltage signals to corresponding ones of the plurality of output buffer integrated circuits;

sequentially receiving and holding n-number of the first pixel voltage signals;

applying a second n-number of input pixel data of the 2n-number of input pixel data received from the timing controller to each of the plurality of digital-to-analog converter integrated circuits;

converting the second n-number of input pixel data input to each of the plurality of digital-to-analog converter integrated circuits into second pixel voltage signals;

dividing the second pixel voltage signals into k-number of pixel voltage signals and outputting the divided second pixel voltage signals to the corresponding ones of the plurality of output buffer integrated circuits; and holding and buffering the second n-number of pixel voltage signals with the first n-number of pixel voltage signals and simultaneously applying the held and buffered pixel voltage signals to the 2n-number of data lines.

21. The method according to claim 20, wherein the timing controller applies the pixel data to each of the plurality of digital-to-analog converter integrated circuits over an odd pixel data transmission line and an even pixel data transmission line, and frequencies of the control signals applied from the timing controller to the plurality of digital-to-analog converter integrated circuits and the pixel data are increased to at least two times.

22. The method according to claim 20, wherein the plurality of digital-to-analog converter integrated circuits are divided into first and second blocks, and the timing controller supplies the pixel data to the plurality of digital-to-analog converter integrated circuits involved in the first block over a first odd pixel data transmission line and a first even pixel data transmission line, and supplies the pixel data to the plurality of digital-to-analog converter integrated circuits involved in the second block over a second odd pixel data transmission line and a second even pixel data transmission line.

* * * * *